United States Patent
Eguchi et al.

(10) Patent No.: US 9,874,368 B2
(45) Date of Patent: Jan. 23, 2018

(54) REFRIGERANT CHANNEL SWITCHING UNIT AND REFRIGERATION APPARATUS INCLUDING SAME

(71) Applicant: DAIKIN INDUSTRIES, LTD., Osaka-shi, Osaka (JP)

(72) Inventors: Akihiro Eguchi, Sakai (JP); Shigeki Kamitani, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 52 days.

(21) Appl. No.: 15/102,231

(22) PCT Filed: Dec. 2, 2014

(86) PCT No.: PCT/JP2014/081837
§ 371 (c)(1),
(2) Date: Jun. 6, 2016

(87) PCT Pub. No.: WO2015/087740
PCT Pub. Date: Jun. 18, 2015

(65) Prior Publication Data
US 2016/0305680 A1 Oct. 20, 2016

(30) Foreign Application Priority Data
Dec. 11, 2013 (JP) .................... 2013-256478

(51) Int. Cl.
*F24F 11/00* (2006.01)
*F24F 3/06* (2006.01)
(Continued)

(52) U.S. Cl.
CPC ............ *F24F 11/008* (2013.01); *F16K 31/04* (2013.01); *F24F 1/32* (2013.01); *F24F 3/065* (2013.01);
(Continued)

(58) Field of Classification Search
CPC .. F24F 11/008; F24F 3/10; F24F 13/30; F24F 3/065; F24F 1/32; F24F 2011/0082;
(Continued)

(56) References Cited

U.S. PATENT DOCUMENTS

2009/0165484 A1* 7/2009 Matsui .................. F24F 3/1411
62/271
2011/0185754 A1* 8/2011 Yamashita ................ F24F 3/06
62/132
(Continued)

FOREIGN PATENT DOCUMENTS

| GB | 2 451 722 A | 2/2009 |
|----|----|----|
| JP | 2008-39276 A | 2/2008 |

(Continued)

OTHER PUBLICATIONS

European Search Report of corresponding EP Application No. 14 86 8751.0 dated Jul. 5, 2017.
(Continued)

*Primary Examiner* — Mohammad M Ali
(74) *Attorney, Agent, or Firm* — Global IP Counselors, LLP

(57) ABSTRACT

A refrigerant channel switching unit is disposed between a heat source unit and a utilization unit to switch flow of refrigerant in the refrigerant circuit. The refrigerant channel switching unit includes a first refrigerant pipe connected to a suction gas communicating pipe, a second refrigerant pipe connected to a high-low pressure gas communicating pipe, third and fourth refrigerant pipes, and first and second electric valves mounted to the first and second refrigerant pipes, respectively. The third refrigerant pipe is connected to the first and second refrigerant pipes and a gas pipe. The fourth refrigerant pipe is connected at ends to a liquid communicating pipe and a liquid pipe. A minute channel is formed in the first or second electric valve. The minute
(Continued)

channel enables the refrigerant to flow through the minute channel even when an opening degree of the valve is set to be the lowest degree.

12 Claims, 19 Drawing Sheets

(51) Int. Cl.

| | | |
|---|---|---|
| *F25B 41/04* | (2006.01) | |
| *F16K 31/04* | (2006.01) | |
| *F25B 43/00* | (2006.01) | |
| *F24F 3/10* | (2006.01) | |
| *F25B 5/02* | (2006.01) | |
| *F24F 1/32* | (2011.01) | |
| *F24F 13/30* | (2006.01) | |
| *F25B 41/06* | (2006.01) | |
| *F25B 13/00* | (2006.01) | |

(52) U.S. Cl.
CPC ............... *F24F 3/10* (2013.01); *F24F 13/30* (2013.01); *F25B 5/02* (2013.01); *F25B 13/00* (2013.01); *F25B 41/04* (2013.01); *F25B 41/062* (2013.01); *F24F 2011/0082* (2013.01); *F25B 41/043* (2013.01); *F25B 43/003* (2013.01); *F25B 43/006* (2013.01); *F25B 2341/0661* (2013.01); *F25B 2500/12* (2013.01); *F25B 2600/2513* (2013.01)

(58) Field of Classification Search
CPC .. F16K 31/04; F25B 5/02; F25B 41/04; F25B 41/062; F25B 13/00; F25B 2500/12; F25B 2341/0661; F25B 43/006; F25B 43/003; F25B 41/043; F25B 2600/2513
USPC ........................................................ 62/239
See application file for complete search history.

(56) References Cited

U.S. PATENT DOCUMENTS

| | | | |
|---|---|---|---|
| 2012/0091375 A1 | 4/2012 | Suganuma | |
| 2013/0205818 A1* | 8/2013 | Morimoto | ............. F25B 25/005 62/186 |
| 2015/0233622 A1 | 8/2015 | Yajima et al. | |

FOREIGN PATENT DOCUMENTS

| | | |
|---|---|---|
| JP | 2008-116073 A | 5/2008 |
| JP | 2010-286129 A | 12/2010 |
| JP | 2012-87841 A | 5/2012 |
| JP | 2013-178075 A | 9/2013 |

OTHER PUBLICATIONS

International Preliminary Report of corresponding PCT Application No. PCT/JP2014/081837 dated Jun. 23, 2016.
International Search Report of corresponding PCT Application No. PCT/JP2014/081837 dated Mar. 3, 2015.

\* cited by examiner

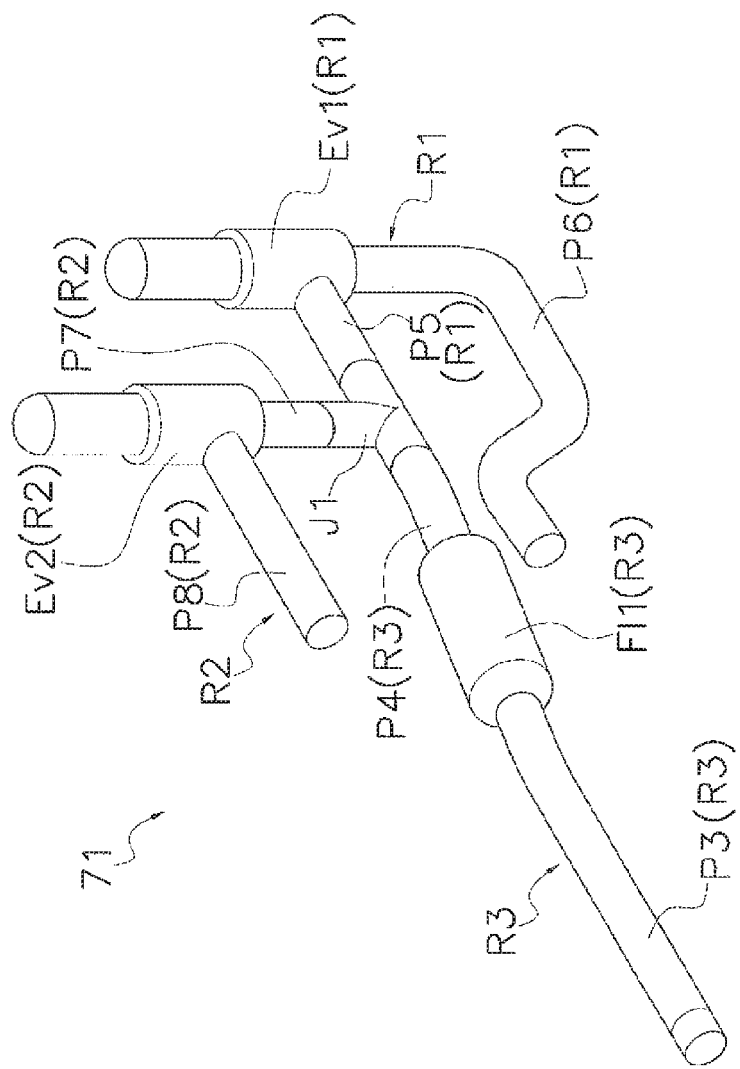
FIG. 14
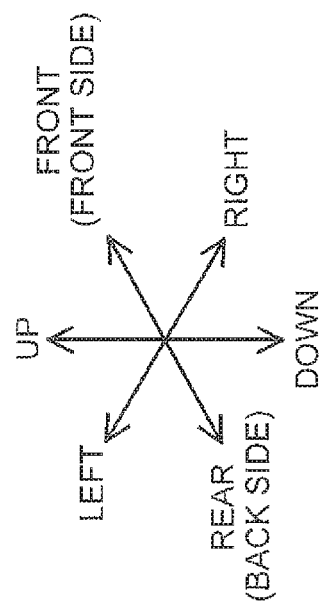

REFRIGERANT CHANNEL SWITCHING UNIT AND REFRIGERATION APPARATUS INCLUDING SAME

CROSS-REFERENCE TO RELATED APPLICATIONS

This U.S. National stage application claims priority under 35 U.S.C. § 119(a) to Japanese Patent Application No. 2013-256478, filed in Japan on Dec. 11, 2013, the entire contents of which are hereby incorporated herein by reference.

TECHNICAL FIELD

The present invention relates to a refrigerant channel switching unit configured and arranged to switch flow of refrigerant and a refrigeration apparatus including the same.

BACKGROUND ART

There has been so far a refrigeration apparatus including a heat source unit, a utilization unit and a refrigerant channel switching unit that is disposed between the heat source unit and the utilization unit and is configured and arranged to switch flow of refrigerant. For example, an air conditioning system disclosed in Japan Laid-open Patent Application Publication No. 2008-39276 includes a heat source unit, a plurality of utilization units and a plurality of refrigerant channel switching units.

Now, FIG. 1 schematically shows a refrigerant circuit of a refrigerant channel switching unit 1 that is an example of a conventional refrigerant channel switching unit. The refrigerant channel switching unit 1 includes a switch valve 4 and a switch valve 5 connected to a refrigerant pipe 3 extending to a utilization unit 2. The switch valves 4 and 5 are provided for switching the flow of the refrigerant. In general, not electro-magnetic valves but electric valves are employed as the switch valves 4 and 5 in order to inhibit refrigerant running sound.

SUMMARY

Technical Problem

The electric valve is, unlike the electro-magnetic valve, configured not to be opened due to its construction even when back pressure acts thereon in a completely closed state. In consideration of this, the conventional refrigerant channel switching unit has been so far generally provided with a separate bypass circuit for letting off the refrigerant in order to avoid degradation in safety attributed to formation of a liquid seal circuit. In the refrigerant channel switching unit 1, capillary tubes 6 and 7 are provided and a bypass circuit 8 and a bypass circuit 9 are formed in order to prevent the refrigerant pipe 3 from becoming a liquid seal circuit.

On the other hand, the refrigerant channel switching unit is generally installed in a small and narrow space such as a space above the ceiling. Hence, the refrigerant channel switching unit is desired to be compactly constructed. However, the conventional refrigerant channel switching unit has been required to reliably have a space for installing the bypass circuit as described above. This has constrained compactness in size of the conventional refrigerant channel switching unit.

In view of the above, it is an object of the present invention to provide a refrigerant channel switching unit and a refrigeration apparatus, each of which inhibits refrigerant running sound and is good in compactness and safety.

Solution to Problem

A refrigerant channel switching unit according to a first aspect of the present invention is disposed between a heat source unit and a utilization unit and is configured and arranged to switch flow of refrigerant in a refrigerant circuit formed by the heat source unit and the utilization unit. The refrigerant channel switching unit configured and arranged to include a first refrigerant pipe, a second refrigerant pipe, a third refrigerant pipe, a fourth refrigerant pipe, a first electric valve and a second electric valve. The first refrigerant pipe is configured and arranged to be connected to a suction gas communicating pipe. The suction gas communicating pipe is configured and arranged to extend from the heat source unit. The second refrigerant pipe is configured and arranged to be connected to a high-low pressure gas communicating pipe. The high-low pressure gas communicating pipe is configured and arranged to extend from the heat source unit. The third refrigerant pipe is configured and arranged to be connected to the first refrigerant pipe, the second refrigerant pipe and a gas pipe. The gas pipe configured and arranged to extend to the utilization unit. The fourth refrigerant pipe is configured and arranged to be connected at one end to a liquid communicating pipe. The liquid communicating pipe is configured and arranged to extend from the heat source unit. The fourth refrigerant pipe is configured and arranged to be connected at the other end to a liquid pipe. The liquid pipe is configured and arranged to extend to the utilization unit. The first electric valve is configured and arranged to be mounted to the first refrigerant pipe. The second electric valve is configured and arranged to be mounted to the second refrigerant pipe. A minute channel is formed in the first electric valve or the second electric valve. The minute channel is configured and arranged to enable the refrigerant to flow through the minute channel even when an opening degree of the first electric valve or the second electric valve is set to be the lowest degree.

In the refrigerant channel switching unit according to the first aspect of the present invention, refrigerant running sound is inhibited, safety is ensured, and compactness in size is enhanced. There is a possibility that the electric valves are fully closed and a liquid seal circuit is formed in such as a refrigerant channel switching unit, which is not provided with a bypass circuit; which includes commonly used electric valves that are not configured to be formed a minute channel, instead of the first and second electric valves; and which is configured to perform a control of regulating the opening degree of each electric valve in accordance with a condition so as to form a bypass channel for refrigerant. In the refrigerant channel switching unit according to the first aspect of the present invention, the minute channel is formed in the first electric valve or the second electric valve configured and arranged to enable the refrigerant to flow through the minute channel even when the opening degree thereof is set to be the lowest degree. With the construction and configuration, formation of a liquid seal circuit within the refrigerant circuit is inhibited without separately providing a bypass circuit for inhibiting liquid sealing. Thus, even when electric valves are employed as switch valves, formation of a liquid seal circuit is inhibited, and simultaneously, compactness in size is promoted. Consequently, refrigerant running sound is inhibited, safety is ensured, and compactness in size is enhanced.

A refrigerant channel switching unit according to a second aspect of the present invention relates to the refrigerant channel switching unit according to the first aspect, and wherein the minute channel is formed in the second electric valve.

In the refrigerant channel switching unit according to the second aspect of the present invention, the minute channel is formed in the second electric valve. Accordingly, safety is further ensured.

Specifically, when the gas refrigerant at high pressure flows through the high-low pressure gas communicating pipe, the volume of the refrigerant existing within the high-low pressure gas communicating pipe is larger than that of the refrigerant existing within the suction gas communicating pipe. Hence, the refrigerant is likely to be accumulated within the high-low pressure gas communicating pipe. However, with the minute channel formed in the second electric valve, the refrigerant existing within the high-low pressure gas communicating pipe and a refrigeration lubricant compatibly mixed with the refrigerant are led to the interior of the refrigerant channel switching unit through the minute channel. Thus, the refrigerant and the refrigeration lubricant are unlikely to be accumulated in the high-low pressure gas communicating pipe. Consequently, safety is further ensured.

A refrigerant channel switching unit according to a third aspect of the present invention relates to the refrigerant channel switching unit according to the first or second aspect, and wherein the minute channel is a groove formed in a valve seat.

In the refrigerant channel switching unit according to the third aspect of the present invention, the minute channel is a groove formed in a valve seat. Thus, the minute channel is formed with the simple construction. Consequently, increase in cost is inhibited.

A refrigerant channel switching unit according to a fourth aspect of the present invention relates to the refrigerant channel switching unit according to the first or second aspect, and wherein the minute channel is a hole formed in a valve seat.

In the refrigerant channel switching unit according to the fourth aspect of the present invention, the minute channel is a hole formed in a valve seat. Thus, the minute channel is formed with the simple construction. Consequently, increase in cost is inhibited.

A refrigeration apparatus according to a fifth aspect of the present invention includes a heat source unit, a utilization unit, a suction gas communicating pipe, a high-low pressure gas communicating pipe, a liquid communicating pipe, a gas pipe, a liquid pipe and the refrigerant channel switching unit according to any of the first to fourth aspects. The heat source unit and the utilization unit is configured and arranged to form a refrigerant circuit. The suction gas communicating pipe, the high-low pressure gas communicating pipe and the liquid communicating pipe are configured and arranged to be connected to the heat source unit. The gas pipe and the liquid pipe are configured and arranged to be connected to the utilization unit.

The refrigeration apparatus according to the fifth aspect of the present invention includes the refrigerant channel switching unit according to any of the first to fourth aspects. With this construction, refrigerant running sound is inhibited, safety of the refrigeration apparatus is ensured, and easiness in installation is enhanced.

Advantageous Effects of Invention

In the refrigerant channel switching unit according to the first aspect of the present invention, even when electric valves are employed as switch valves, formation of a liquid seal circuit is inhibited, and simultaneously, compactness in size is promoted. Therefore, refrigerant running sound is inhibited, safety is ensured, and compactness in size is enhanced.

In the refrigerant channel switching unit according to the second aspect of the present invention, safety is further ensured.

In the refrigerant channel switching unit according to each of the third and fourth aspects, increase in cost is inhibited.

In the refrigeration apparatus according to the fifth aspect of the present invention, refrigerant running sound is inhibited, safety of the refrigeration apparatus is ensured, and easiness in installation is enhanced.

BRIEF DESCRIPTION OF THE DRAWINGS

FIG. 14 is a perspective view of a first unit.

DESCRIPTION OF EMBODIMENT

An air conditioning system 100 according to an embodiment of the present invention will be hereinafter explained with reference to drawings. It should be noted that the following embodiment is a specific example of the present invention, and is not intended to limit the technical scope of the present invention, and can be arbitrarily changed without departing from the scope of the present invention. Additionally, in the following embodiment, the directional terms "up", "down", "left", "right", "front (front side)" and "rear (back side)" mean directions depicted in FIGS. 5 to 15.

(1) Air Conditioning System 100

Figure 1:
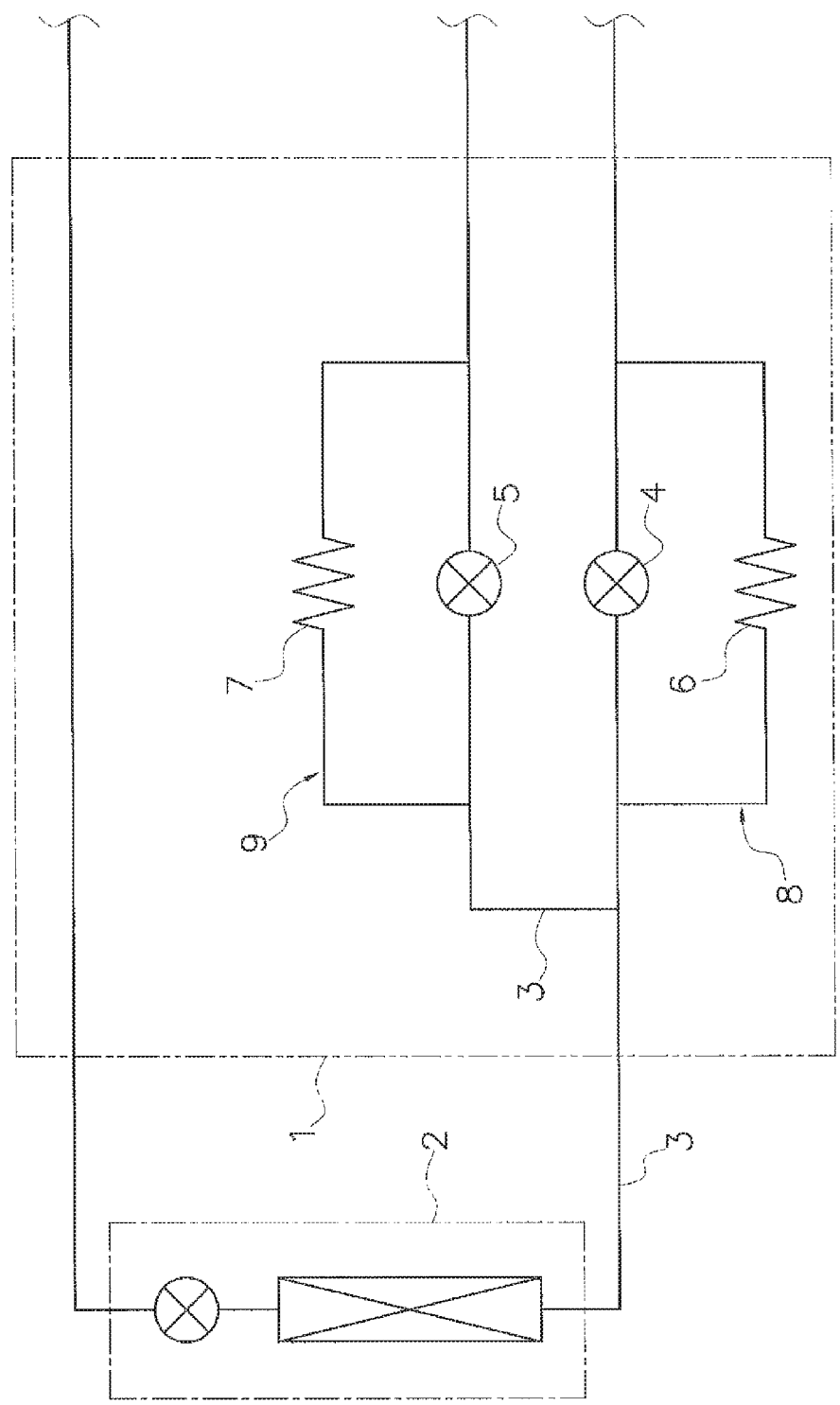
FIG. 1 is a schematic diagram of a refrigerant circuit in a conventional refrigerant channel switching unit.
Figure 2:
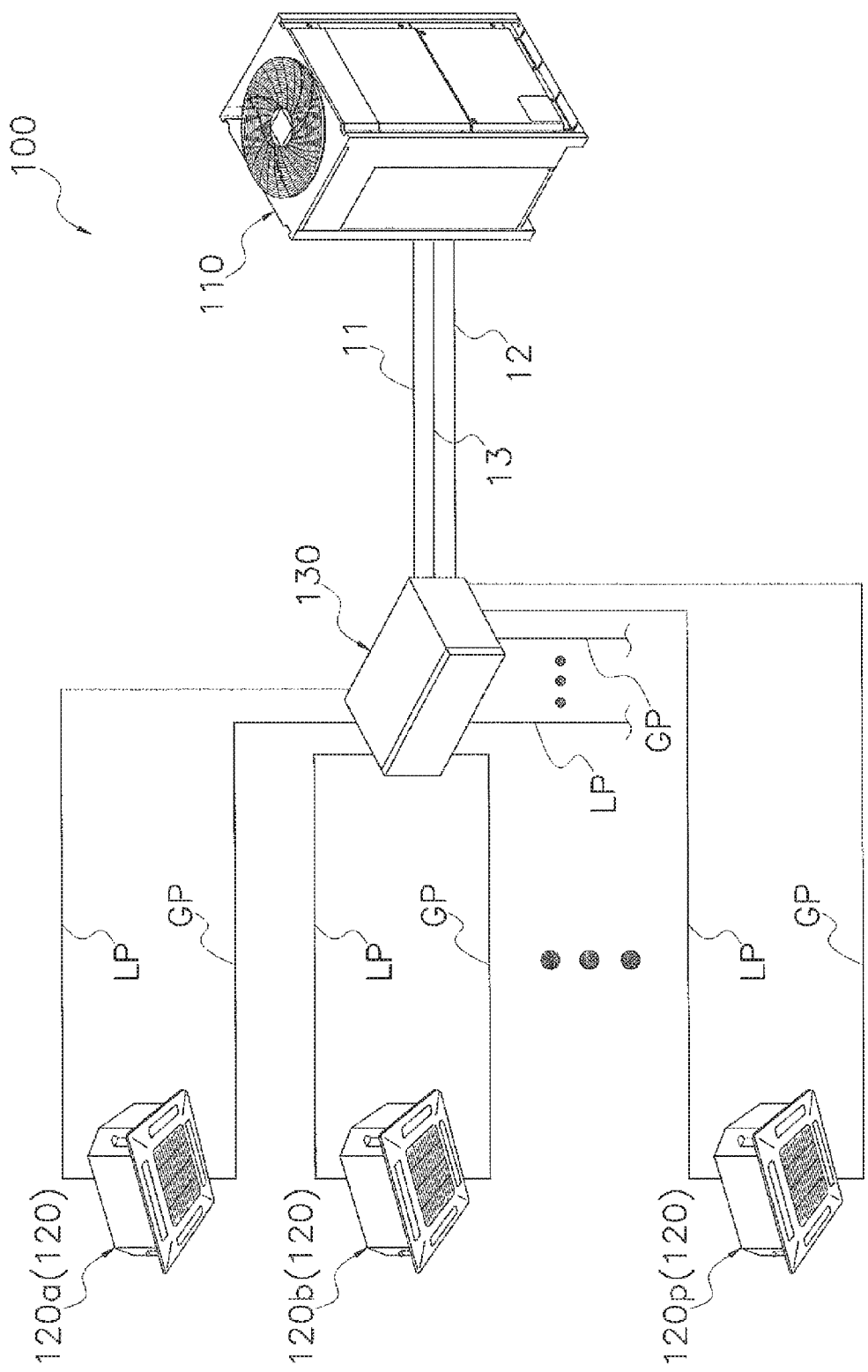
FIG. 2 is a diagram of an entire configuration of an air conditioning system according to an embodiment of the present invention.

FIG. 2 is a diagram of an entire configuration of the air conditioning system 100. The air conditioning system 100 is installed in a building, a factory or the like, and implements air conditioning in a target space. The air conditioning system 100, which is an air conditioning system of a refrigerant pipe type, is configured to perform a refrigeration cycle operation of a vapor compression type and performs cooling, heating or the like of the target space.

The air conditioning system 100 mainly includes a single outdoor unit 110 as a heat source unit, a plurality of indoor units 120 as utilization units, and an intermediate unit 130 configured and arranged to switch flow of refrigerant into the respective indoor units 120. Additionally, the air conditioning system 100 includes a liquid communicating pipe 11, a suction gas communicating pipe 12 and a high-low pressure gas communicating pipe 13 and a plurality of pairs of a liquid pipe LP and a gas pipe GP. The liquid communicating pipe 11, the suction gas communicating pipe 12 and the high-low pressure gas communicating pipe 13 connect the outdoor unit 110 and the intermediate unit 130. The liquid pipe LP and the gas pipe GP that connect the intermediate unit 130 and the indoor unit 120.

The air conditioning system 100 is configured to perform the refrigeration cycle operation that the refrigerant encapsulated in a refrigerant circuit is compressed, cooled or condensed, decompressed, heated or evaporated, and then, compressed again. It should be noted that the air conditioning system 100 is of a so-called cooling/heating free type that either a cooling operation or a heating operation is freely selectable in each of the indoor units 120.

The air conditioning system 100 will be hereinafter explained in detail.

(2) Detailed Explanation of Air Conditioning System 100

(2-1) Outdoor Unit 110

Figure 3:
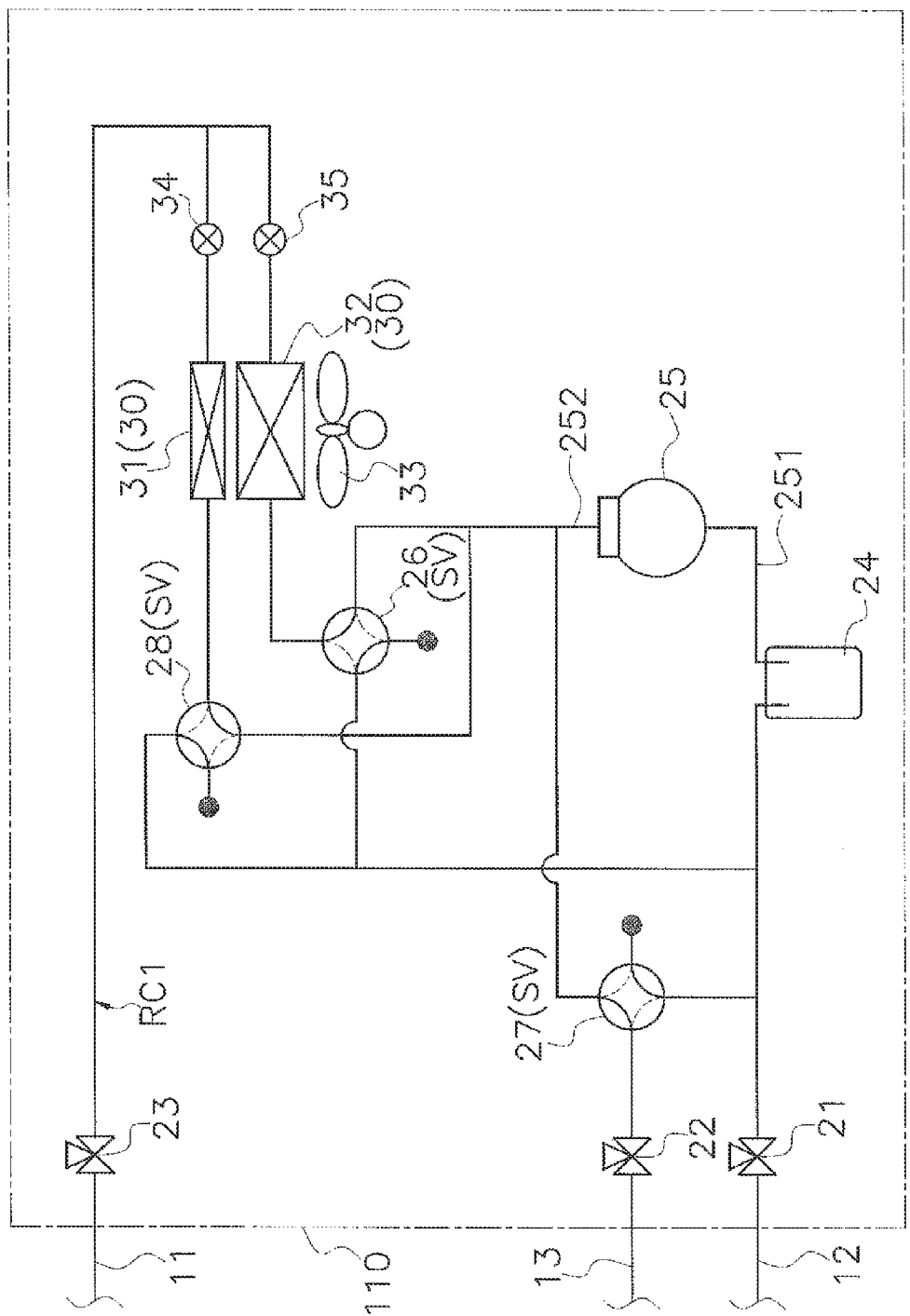
FIG. 3 is a diagram of a refrigerant circuit within an outdoor unit.

FIG. 3 is a diagram of a refrigerant circuit within the outdoor unit 110. The outdoor unit 110 is installed in an outdoor space (e.g., a roof or a veranda of a building) or a basement. A variety of machines are disposed within the outdoor unit 110 and are connected through refrigerant pipes, whereby a heat source-side refrigerant circuit RC1 is formed. The heat source-side refrigerant circuit RC1 is connected to a gas refrigerant circuit RC3 (to be described) and a liquid refrigerant circuit RC4 (to be described), which are provided within the intermediate unit 130, through the liquid communicating pipe 11, the suction gas communicating pipe 12 and the high-low pressure gas communicating pipe 13.

The heat source-side refrigerant circuit RC1 is formed by mainly connecting a first gas-side stop valve 21, a second gas-side stop valve 22, a liquid-side stop valve 23, an accumulator 24, a compressor 25, a first channel switch valve 26, a second channel switch valve 27, a third channel switch valve 28, an outdoor heat exchanger 30, a first outdoor expansion valve 34 and a second outdoor expansion valve 35 through a plurality of refrigerant pipes. Additionally, an outdoor fan 33, an outdoor unit controller (not shown in the drawings) and the like are disposed within the outdoor unit 110.

Machines designed to be disposed within the outdoor unit 110 will be hereinafter explained.

(2-1-1) First Gas-Side Stop Valve 21, Second Gas-Side Stop Valve 22 and Liquid-Side Stop Valve 23

The first gas-side stop valve 21, the second gas-side stop valve 22 and the liquid-side stop valve 23 are manual valves configured to be opened/closed in a refrigerant filling work, a pump-down work, or the like. The first gas-side stop valve 21 is connected at one end to the suction gas communicating pipe 12, and is also connected at the other end to the refrigerant pipe extending to the accumulator 24. The second gas-side stop valve 22 is connected at one end to the high-low pressure gas communicating pipe 13, and is also connected at the other end to the refrigerant pipe extending to the second channel switch valve 27. The liquid-side stop valve 23 is connected at one end to the liquid communicating pipe 11, and is also connected at the other end to the refrigerant pipe extending to either the first outdoor expansion valve 34 or the second outdoor expansion valve 35.

(2-1-2) Accumulator 24

The accumulator 24 is a container for temporarily accumulating the refrigerant at low pressure to be sucked into the compressor 25 and performing gas-liquid separation for the refrigerant. In the interior of the accumulator 24, the refrigerant in a gas-liquid dual-phase state is separated into the gas refrigerant and the liquid refrigerant. The accumulator 24 is disposed between the first gas-side stop valve 21 and the compressor 25. The refrigerant pipe extending from the first gas-side stop valve 21 is connected to a refrigerant inlet of the accumulator 24. A suction pipe 251 extending to the compressor 25 is connected to a refrigerant outlet of the accumulator 24.

(2-1-3) Compressor 25

The compressor 25 has a sealed structure in which a compressor motor is embedded. The compressor 25 is a displacement compressor such as a scroll compressor or a rotary compressor. It should be noted that only one compressor 25 is provided in the present embodiment, however, the number of the compressors 25 is not limited to one, and two or more compressors 25 may be connected in parallel. The suction pipe 251 is connected to a suction port (not shown in the drawings) of the compressor 25. The compressor 25 is configured to suck the refrigerant at low pressure through the suction port, compress the sucked refrigerant, and then discharge the compressed refrigerant through a discharge port (not shown in the drawings). A discharge pipe 252 is connected to the discharge port of the compressor 25.

(2-1-4) First Channel Switch Valve 26, Second Channel Switch Valve 27 and Third Channel Switch Valve 28

The first channel switch valve 26, the second channel switch valve 27 and the third channel switch valve 28 (hereinafter collectively referred to as "channel switch valves SV") are four-way switch valves and are configured to switch the flow of the refrigerant in accordance with conditions (see solid line and broken line in FIG. 3). The discharge pipe 252 or branch pipes extending from the discharge pipe 252 are respectively connected to the refrigerant inlet of each channel switch valve SV. Additionally, each channel switch valve SV is configured to block the flow of the refrigerant in one of the refrigerant channels during operation and practically functions as a three-way valve.

(2-1-5) Outdoor Heat Exchanger 30 and Outdoor Fan 33

The outdoor heat exchanger 30 is a heat exchanger of a cross-fin type or a micro-channel type. The outdoor heat exchanger 30 includes a first heat exchange portion 31 and a second heat exchange portion 32. In the outdoor heat exchanger 30, the first heat exchange portion 31 is mounted to an upper position, whereas the second heat exchange portion 32 is mounted to a lower position than the first heat exchange portion 31.

The first heat exchange portion 31 is connected at one end to the refrigerant pipe that is connected to the third channel switch valve 28, and is also connected at the other end to the refrigerant pipe extending to the first outdoor expansion valve 34. The second heat exchange portion 32 is connected at one end to the refrigerant pipe that is connected to the first channel switch valve 26, and is also connected at the other end to the refrigerant pipe extending to the second outdoor expansion valve 35. The refrigerant passing through the first heat exchange portion 31 and that passing through the second heat exchange portion 32 are configured to exchange heat with airflow to be generated by the outdoor fan 33.

The outdoor fan 33 is a propeller fan, for instance, and is configured to be driven in conjunction with an outdoor fan motor (not shown in the drawings). When the outdoor fan 33 is driven, the airflow, which flows into the outdoor unit 110, passes through the outdoor heat exchanger 30, and flows out from the outdoor unit 110, is generated.

(2-1-6) First Outdoor Expansion Valve 34 and Second Outdoor Expansion Valve 35

Each of the first outdoor expansion valve 34 and the second outdoor expansion valve 35 is, for instance, an electric valve that its opening degree is adjustable. The first outdoor expansion valve 34 is connected at one end to the refrigerant pipe extending from the first heat exchange portion 31, and is also connected at the other end to the refrigerant pipe extending to the liquid-side stop valve 23. The second outdoor expansion valve 35 is connected at one end to the refrigerant pipe extending from the second heat exchange portion 32, and is also connected at the other end to the refrigerant pipe extending to the liquid-side stop valve 23. Each of the first outdoor expansion valve 34 and the second outdoor expansion valve 35 is configured to adjust its opening degree in accordance with conditions, and decompress the refrigerant passing through its interior in accordance with its opening degree.

(2-1-7) Outdoor Unit Controller

The outdoor unit controller is a microcomputer composed of a CPU, a memory and the like. The outdoor unit controller is configured to send/receive signals to/from indoor unit controllers (to be described) and an intermediate unit controller 132 (to be described) through communication lines (not shown in the drawings). In response to received signals and the like, the outdoor unit controller is configured to control activation/deactivation and the rotational speed of the compressor 25 and those of the outdoor fan 33 and is also configured to control opening/closing and opening degree adjustment of a variety of valves.

(2-2) Indoor Units 120

Figure 4:
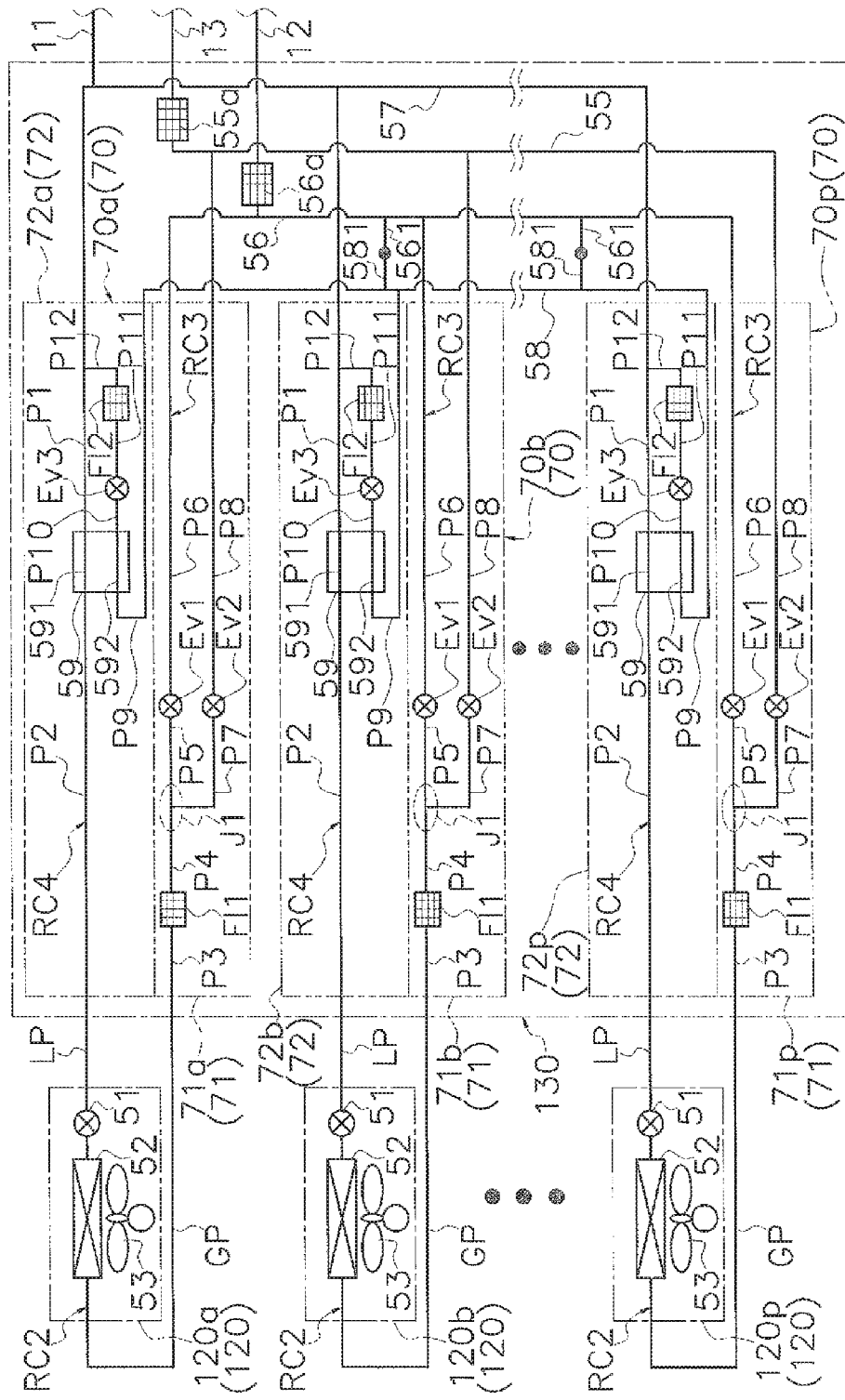
FIG. 4 is a diagram of refrigerant circuits within indoor units and an intermediate unit.

FIG. 4 is a diagram of refrigerant circuits within the indoor units 120 and the intermediate unit 130. Each of the indoor units 120 is of a so-called ceiling embedded type or a so-called ceiling suspended type that is installed in a space above the ceiling or the like, or alternatively, is of a wall mounted type that is mounted to the inner wall of an indoor space or the like. The air conditioning system 100 of the present embodiment includes the plural indoor units 120. Specifically, 16 sets of indoor units (120a to 120p) are disposed therein.

A utilization-side refrigerant circuit RC2 is formed in each indoor unit 120. In each utilization-side refrigerant circuit RC2, an indoor expansion valve 51 and an indoor heat exchanger 52 are provided, and are connected to each other through a refrigerant pipe. Additionally, an indoor fan 53 and the indoor unit controller (not shown in the drawings) are disposed within each indoor unit 120.

The indoor expansion valve 51 is an electric valve that its opening degree is adjustable. The indoor expansion valve 51 is connected at one end to a relevant one of the liquid pipes LP, and is also connected at the other end to the refrigerant pipe extending to the indoor heat exchanger 52. The indoor expansion valve 51 is configured to decompress the refrigerant passing therethrough in accordance with its opening degree.

The indoor heat exchanger 52 is a heat exchanger of a cross-fin type or a micro-channel type, for instance, and includes a heat transfer tube (not shown in the drawings). The indoor heat exchanger 52 is connected at one end to the refrigerant pipe extending from the indoor expansion valve 51, and is also connected at the other end to a relevant one of the gas pipes GP. The refrigerant, flowing into the indoor heat exchanger 52, exchanges heat with airflow to be generated by the indoor fan 53 when passing through the heat transfer tube.

The indoor fan 53 is, for instance, a cross-flow fan or a sirocco fan. The indoor fan 53 is configured to be driven in conjunction with an indoor fan motor (not shown in the drawings). When the indoor fan 53 is driven, the airflow, which flows into the indoor unit 120 from an indoor space, passes through the indoor heat exchanger 52, and then flows out to the indoor space, is generated.

The indoor unit controller is a microcomputer composed of a CPU, a memory and the like. The indoor unit controller is configured to receive an instruction inputted by a user through a remote controller (not shown in the drawings) and drive the indoor fan 53 and the indoor expansion valve 51 in response to this instruction. Additionally, the indoor unit controller is connected to the outdoor unit controller and the intermediate unit controller 132 (to be described) through a communication line (not shown in the drawings), and is configured to send/receive signals thereto/therefrom.

(2-3) Intermediate Unit 130

Figure 5:
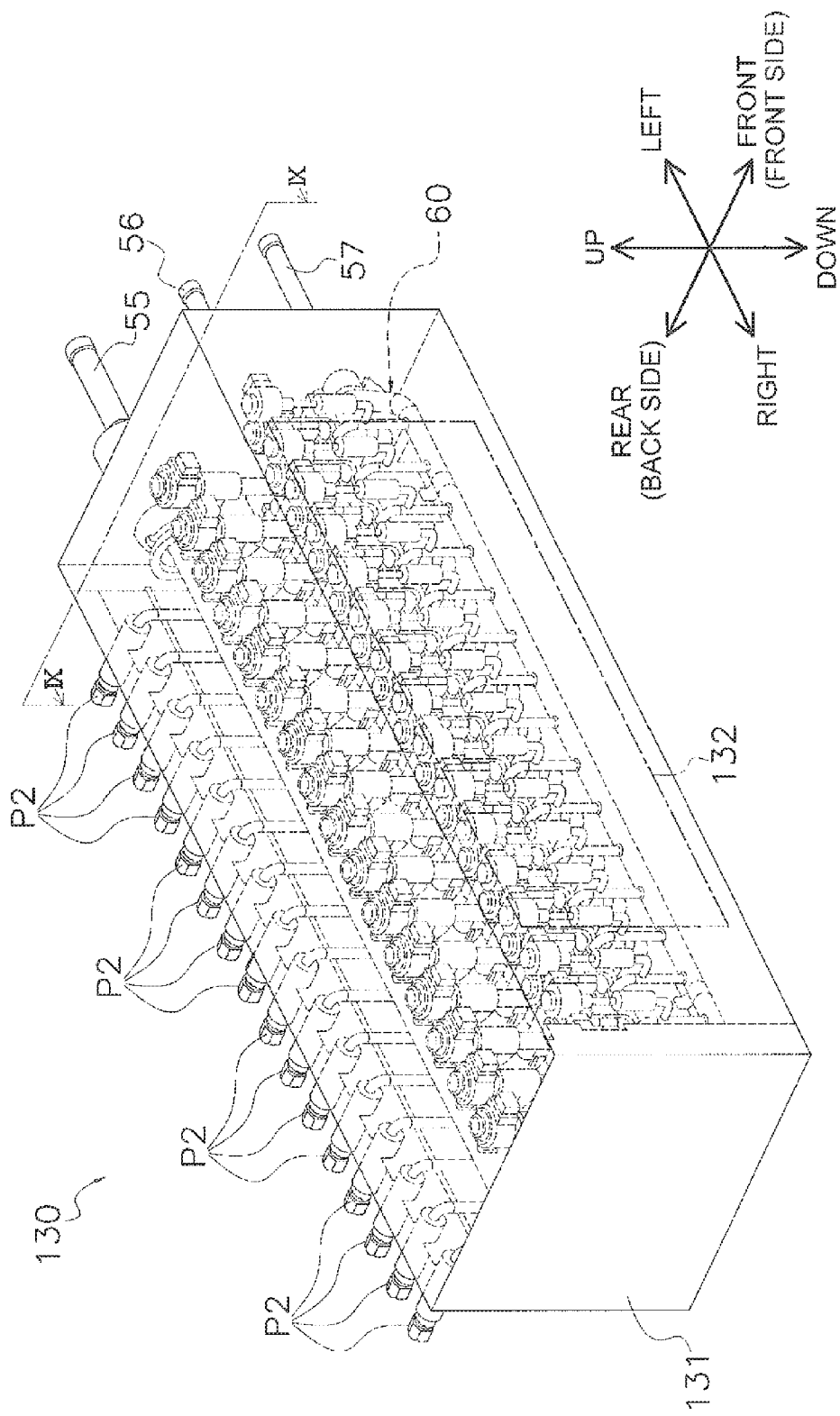
FIG. 5 is a perspective view of the intermediate unit according to the embodiment of the present invention.
Figure 6:
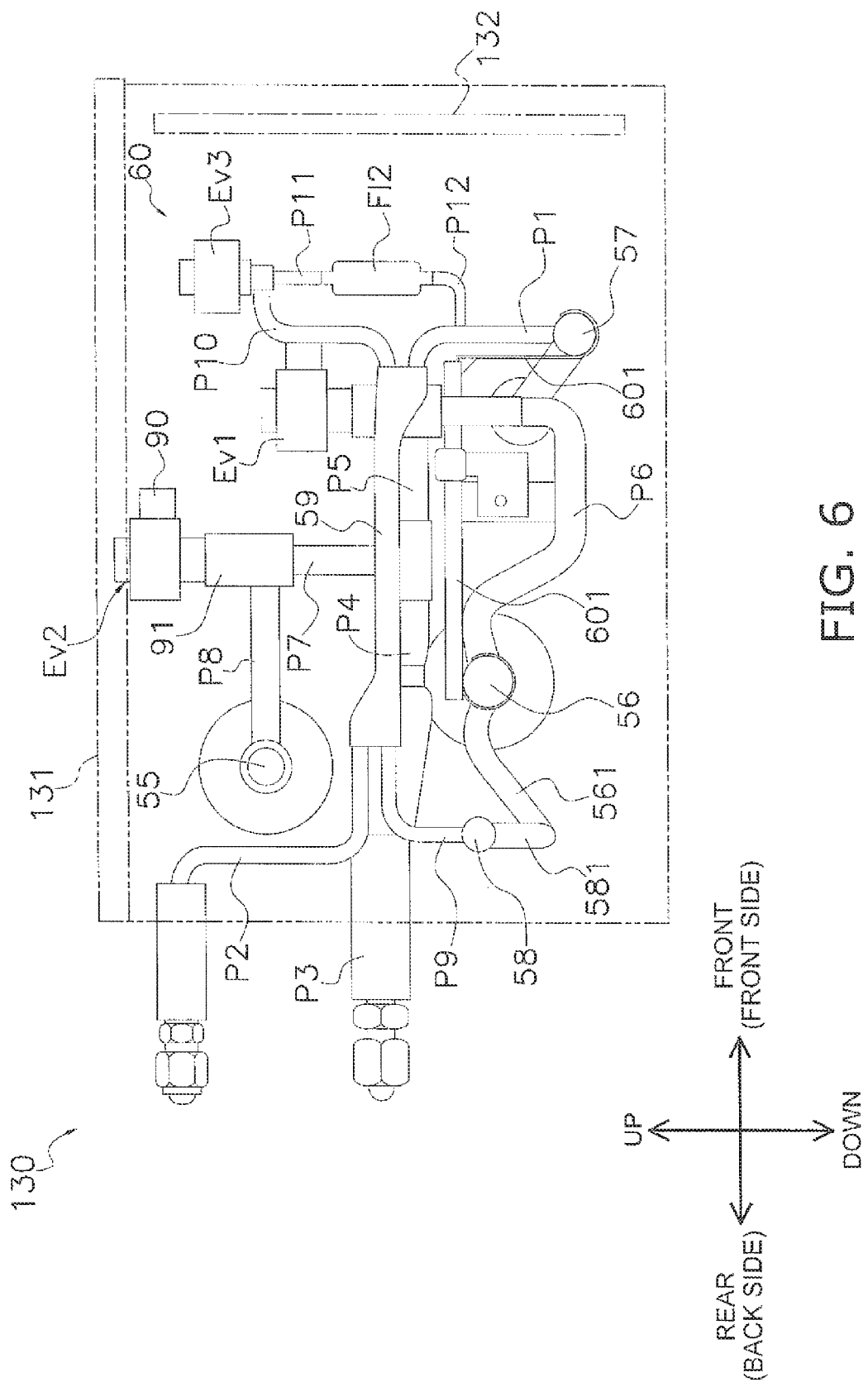
FIG. 6 is a right side view of the intermediate unit.
Figure 7:
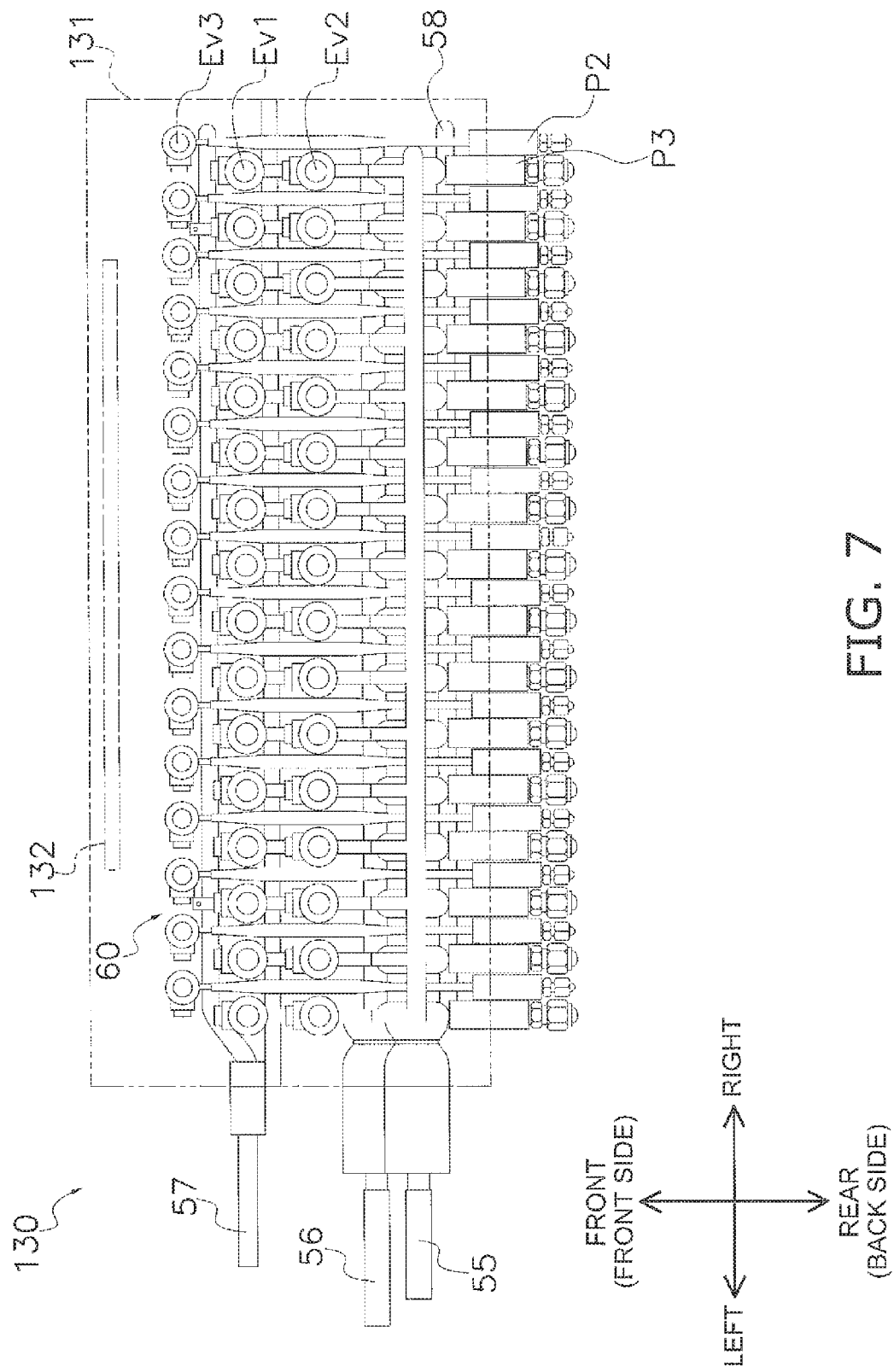
FIG. 7 is a top view of the intermediate unit.
Figure 8:
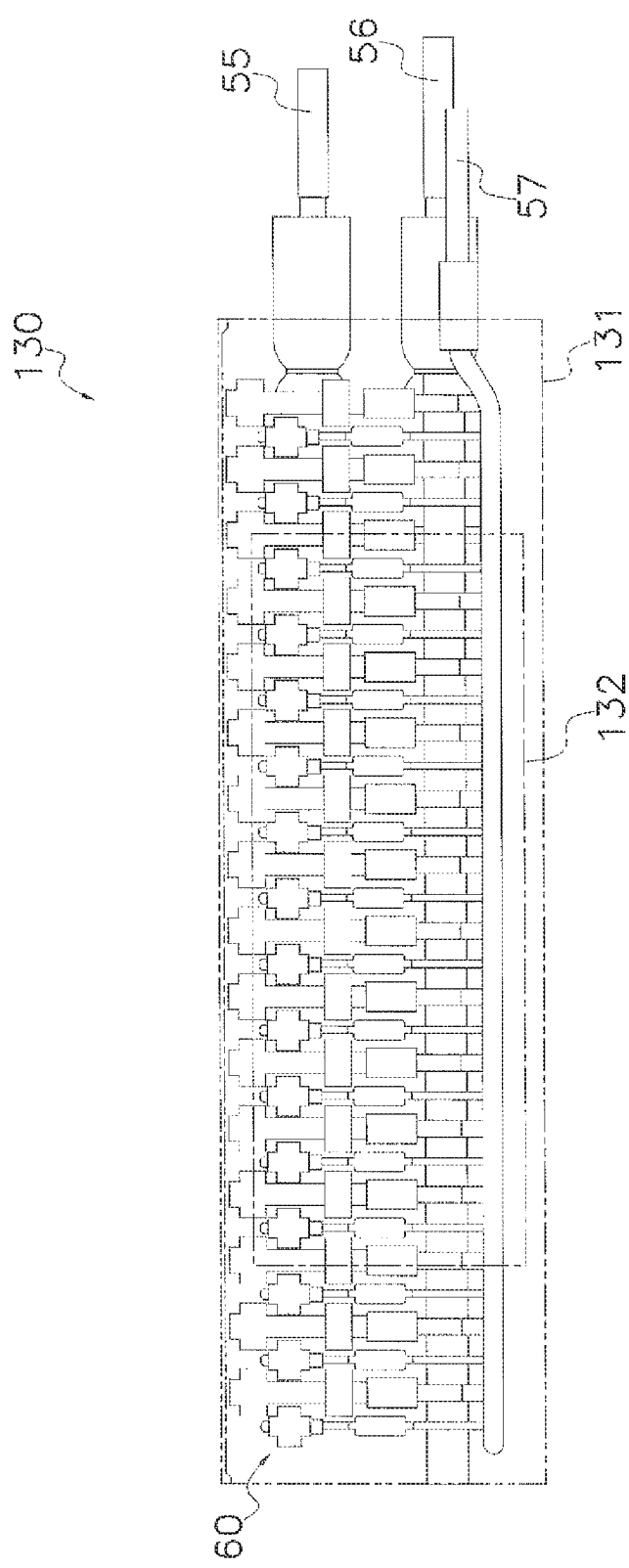
FIG. 8 is a front view of the intermediate unit.
Figure 9:
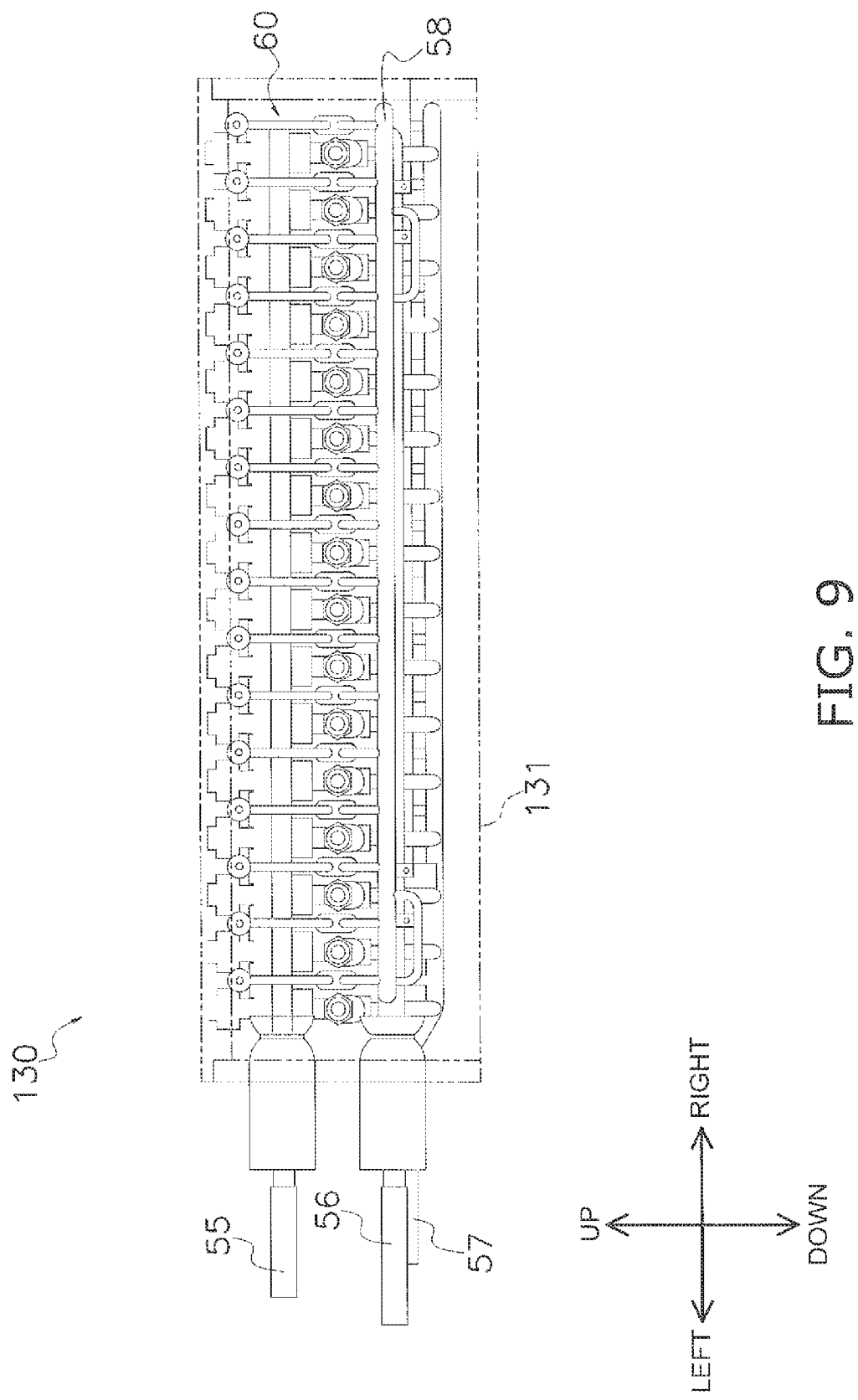
FIG. 9 is a rear view of the intermediate unit.
Figure 10:
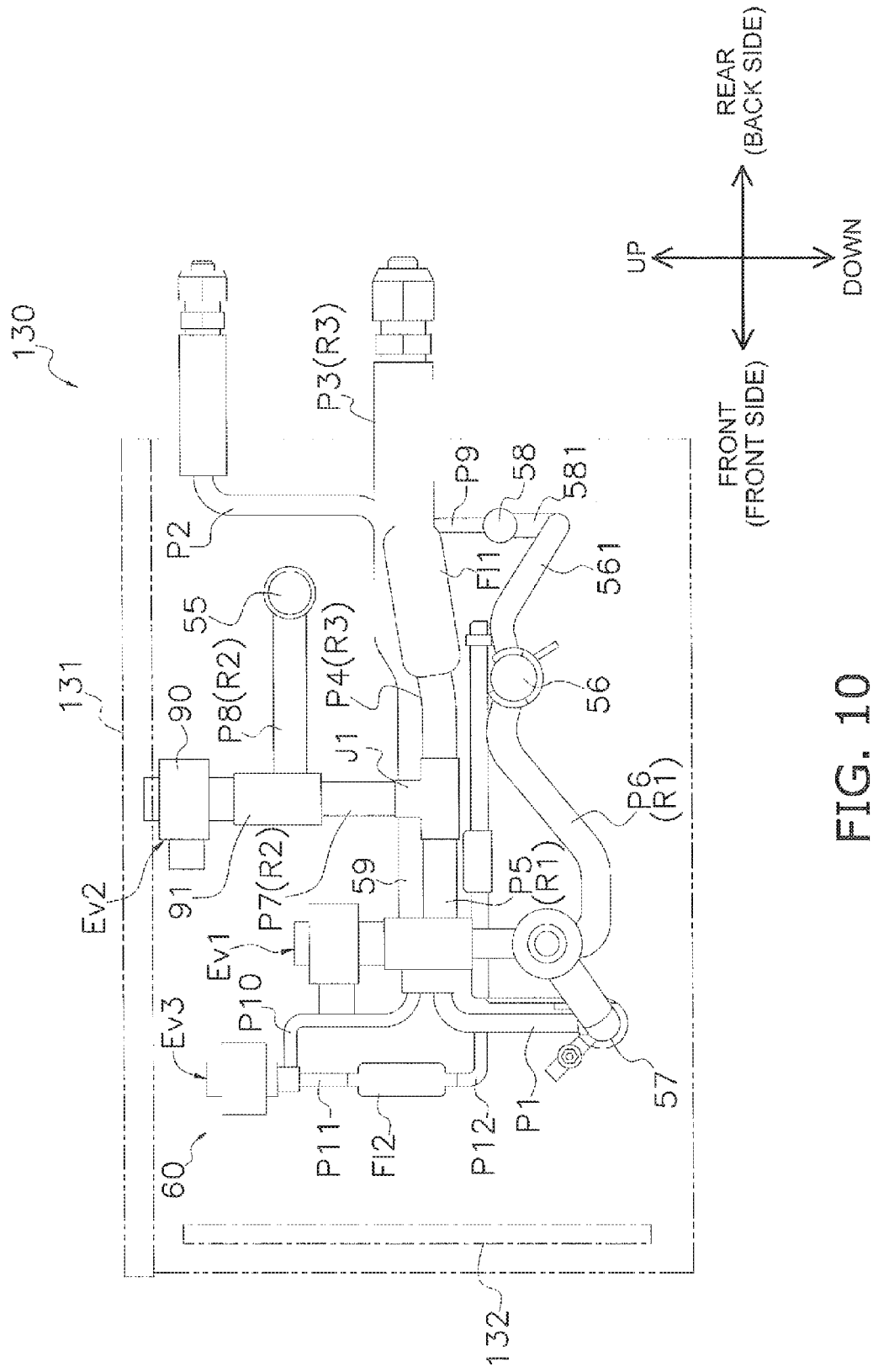
FIG. 10 is a cross-sectional view of FIG. 5 taken along line IX-IX.

The intermediate unit 130 will be hereinafter explained. FIG. 5 is a perspective view of the intermediate unit 130. FIG. 6 is a right side view of the intermediate unit 130. FIG. 7 is a top view of the intermediate unit 130. FIG. 8 is a front view of the intermediate unit 130. FIG. 9 is a rear view of the intermediate unit 130. FIG. 10 is a cross-sectional view of FIG. 5 taken along line IX-IX.

The intermediate unit 130 is disposed between the outdoor unit 110 and the respective indoor units 120, and is configured to switch the flow of the refrigerant flowing into the outdoor unit 110 and the flow of the refrigerant flowing into each indoor unit 120. The intermediate unit 130 includes a casing 131 made of metal. The casing 131 is made in an approximately cubical shape, and a drain pan (not shown in the drawings) is detachably mounted to the bottom of the casing 131. The casing 131 mainly accommodates a BS unit assembly 60 and the intermediate unit controller 132.

(2-3-1) BS Unit Assembly 60

Figure 11:
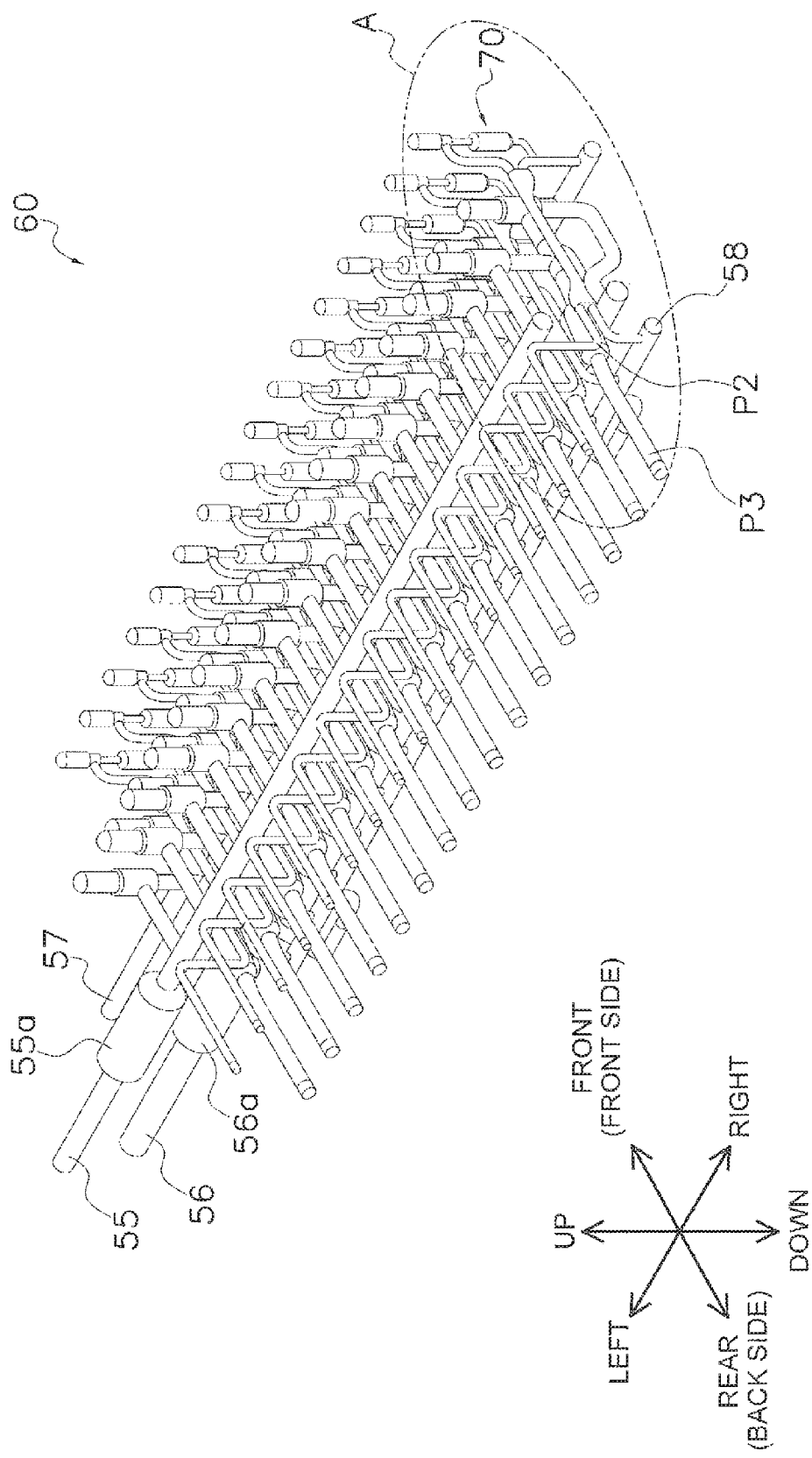
FIG. 11 is a perspective view of a BS unit assembly.
Figure 12:
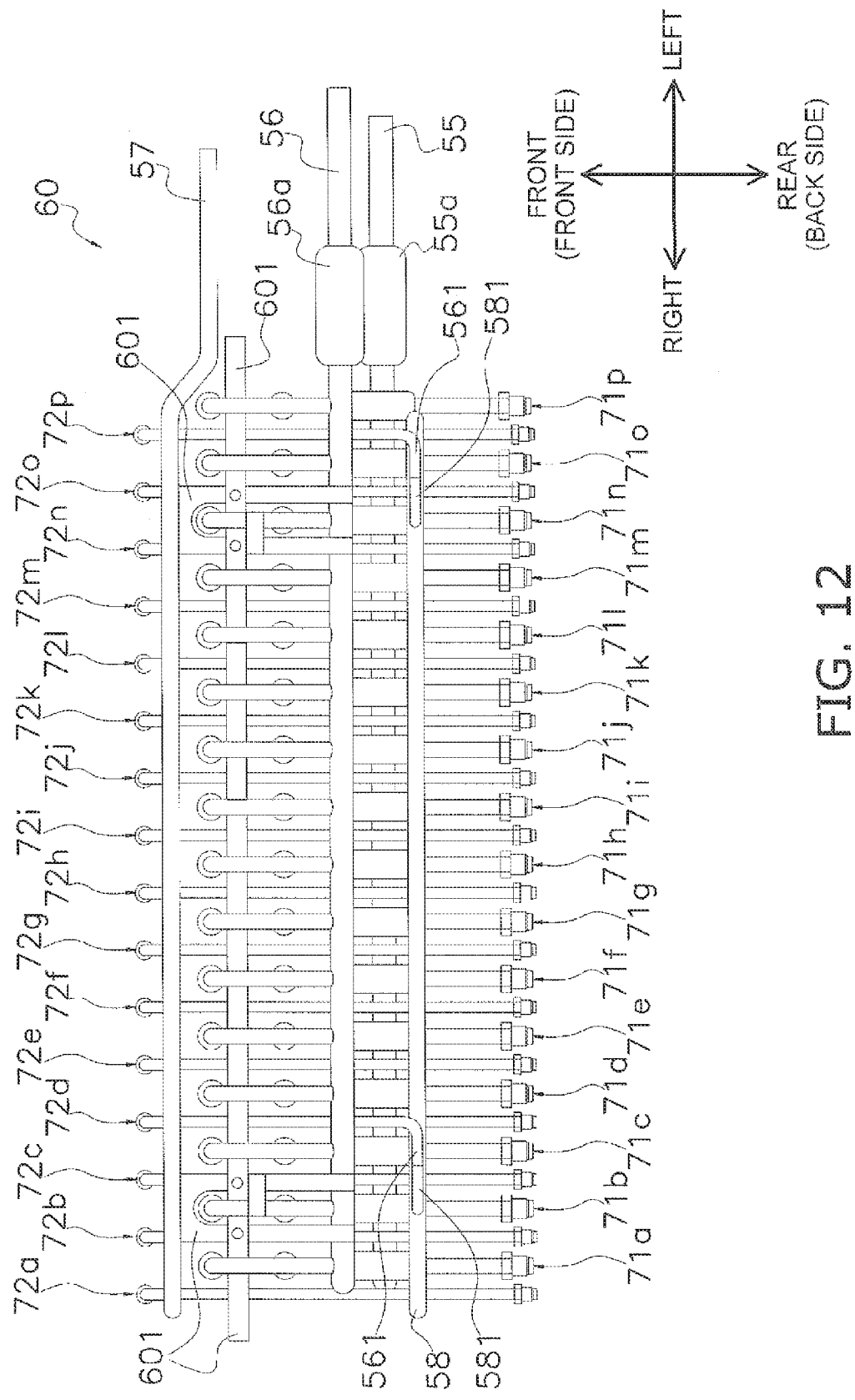
FIG. 12 is a bottom view of the BS unit assembly.

FIG. 11 is a perspective view of the BS unit assembly 60. FIG. 12 is a bottom view of the BS unit assembly 60.

Figure 13:
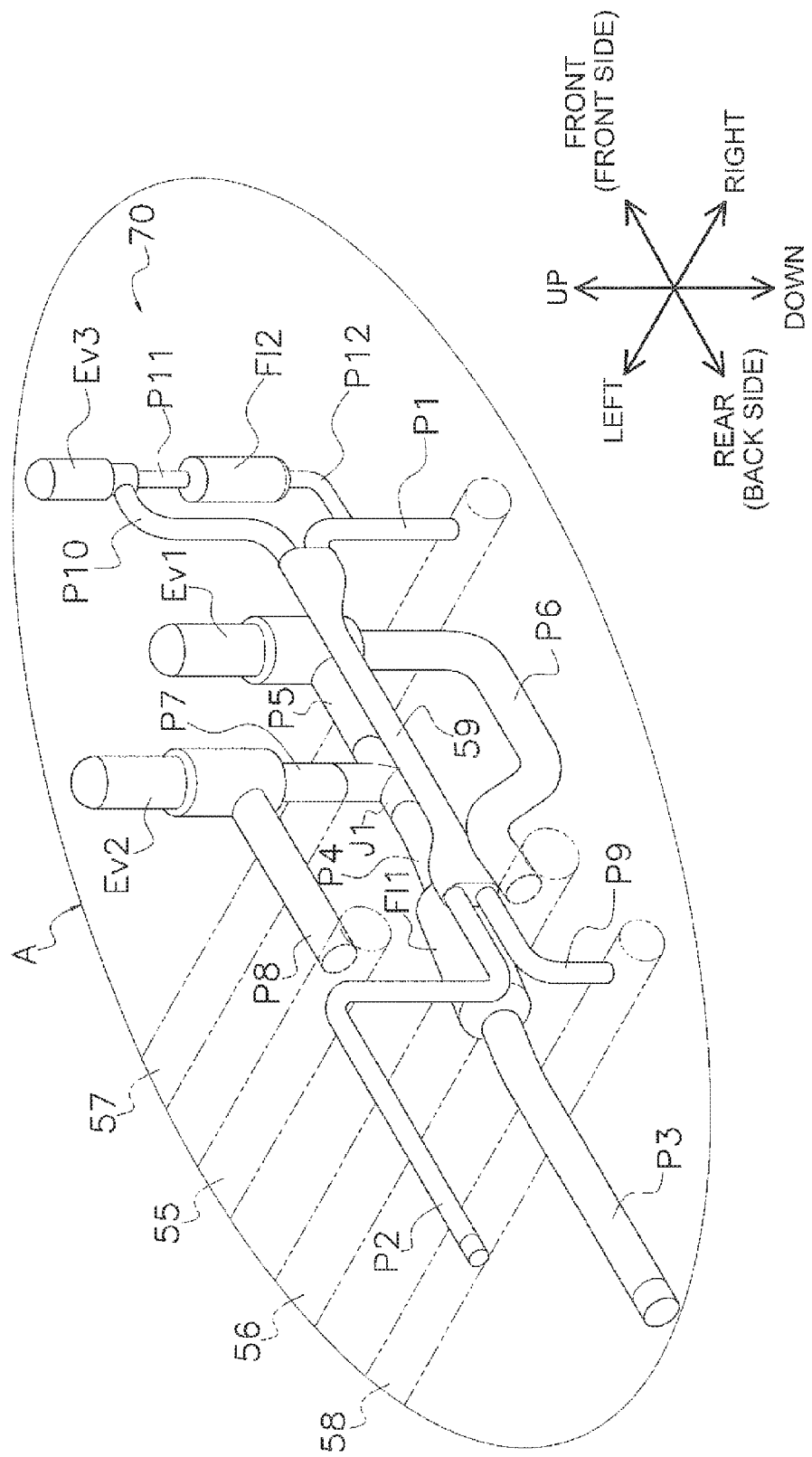
FIG. 13 is an enlarged view of a BS unit illustrated in a region A of FIG. 11.

As shown in FIG. 11, FIG. 12 and the like, the BS unit assembly 60 is constructed by the combination of a plurality of refrigerant pipes, electric valves and the like. The BS unit assembly 60 is conceptually assembled by aggregating a plurality of the BS units 70, each of which is shown in FIG. 13. In the present embodiment, the BS unit assembly 60 includes a plurality of headers (a first header 55, a second header 56, a third header 57 and a fourth header 58) and the BS units 70, the number of which is the same as that of the indoor units 120. Specifically, the BS unit assembly 60 includes 16 sets of the BS units 70a to 70p (see FIG. 4, etc.).

(2-3-1-1) First Header 55, Second Header 56, Third Header 57 and Fourth Header 58

The first header 55 is connected to and communicated with the high-low pressure gas communicating pipe 13. The first header 55 includes a first header filter 55a in the vicinity of its connected part to the high-low pressure gas communicating pipe 13 (see FIG. 11). The first header filter 55a is configured to remove foreign objects contained in the refrigerant passing therethrough. The first header 55 is connected approximately perpendicularly to an eighth pipe P8 of each first unit 71 to be described.

The second header 56 is connected to and communicated with the suction gas communicating pipe 12. The second header 56 includes a second header filter 56a in the vicinity of its connected part to the suction gas communicating pipe 12 (see FIG. 11). The second header filter 56a is configured to remove foreign objects contained in the refrigerant passing therethrough. Additionally, the second header 56 is connected approximately perpendicularly to a sixth pipe P6 of each first unit 71 to be described.

Moreover, the second header 56 includes first connecting parts 561 located right and left. The first connecting parts 561 are connected to second connecting parts 581 (to be described) of the fourth header 58. The second header 56 is communicated with the fourth header 58 through these first connecting parts 561 (see FIGS. 12 and 16). Each first connecting part 561 gently extends upward from the second header 56, then curves and extends downward (see FIGS. 6 and 10). Each first connecting part 561 thus upwardly extends from the second header 56 in order to form a trap for inhibiting the refrigerant existing in the second header 56 and the refrigerator oil compatibly mixed with the refrigerant from flowing into each first connecting part 561 in a situation such as deactivation of the air conditioning system 100.

The third header 57 is connected to and communicated with the liquid communicating pipe 11. The third header 57 is connected approximately perpendicularly to a first pipe P1 of each liquid communicating unit 73 to be described.

The fourth header 58 is connected approximately perpendicularly to a ninth pipe P9 of each bypass unit 74 to be described. Additionally, the fourth header 58 includes the second connecting parts 581 located right and left. The second connecting parts 581 are connected to the first connecting parts 561 of the second header 56. The fourth header 58 is communicated with the second header 56 through the second connecting parts 581 (see FIGS. 12 and 16).

The first header 55, the second header 56, the third header 57 and the fourth header 58 extend along the right-and-left direction (horizontal direction). The first header 55, the second header 56 and the third header 57 are exposed to the outside via through holes bored in the left lateral surface of the casing 131. Additionally, regarding the positional relation among the headers in the height direction, the first header 55, the fourth header 58, the second header 56 and the third header 57 are aligned from top to bottom in this sequential order (see FIGS. 6 and 10). On the other hand, regarding the positional relation among the headers in the back-and-forth direction, the fourth header 58, the first header 55, the second header 56 and the third header 57 are aligned in this sequential order from the back side to the front side (see FIGS. 6 and 10).

It should be noted that the first header 55, the second header 56, the third header 57 and the fourth header 58 extend in approximately parallel to each other.

(2-3-1-2) BS Units 70

The BS units 70 are associated with the indoor units 120 on a one-to-one basis. For example, the BS unit 70a is associated with the indoor unit 120a, the BS unit 70b is associated with the indoor unit 120b, and the BS unit 70p is associated with the indoor unit 120p. Each BS unit 70 will be explained in detail in "(3) Detailed Explanation of BS Unit 70" to be described.

(2-3-2) Intermediate Unit Controller 132

The intermediate unit controller 132 is a microcomputer composed of a CPU, a memory and the like. The intermediate unit controller 132 is configured to receive a signal from either each indoor unit controller or the outdoor unit controller through the communication line and control opening/closing of each of a first electric valve Ev1 (to be described), a second electric valve Ev2 (to be described) and a third electric valve Ev3 (to be described) in accordance with this signal.

(3) Detailed Explanation of BS Unit 70

Each BS unit 70 (corresponding to "refrigerant channel switching unit" described in claims) will be hereinafter explained in detail. FIG. 13 is an enlarged view of each BS unit 70 shown in a region A of FIG. 11.

Each BS unit 70 is disposed between the outdoor unit 110 and its relevant indoor unit 120, and is configured and arranged to switch the flow of the refrigerant. Each BS unit 70 is mainly composed of the first unit 71 shown in FIG. 14 and a second unit 72 shown in FIG. 15.

(3-1) First Unit 71

FIG. 14 is a perspective view of the first unit 71. The first unit 71 is a unit for composing the gas refrigerant circuit RC3 within each BS unit 70.

The first unit 71 is connected to the high-low pressure gas communicating pipe 13 through the first header 55, is connected to the suction gas communicating pipe 12 through the second header 56, and is connected to its relevant utilization-side refrigerant circuit RC2 through its relevant gas pipe GP. The first unit 71 is mainly configured to cause the gas refrigerant to flow between either the high-low pressure gas communicating pipe 13 or the suction gas communicating pipe 12 and its relevant utilization-side refrigerant circuit RC2.

The first unit 71 includes the first electric valve Ev1 and the second electric valve Ev2 as switch valves. Additionally, the first unit 71 includes a first filter F11. Moreover, the first unit 71 includes a third pipe P3, a fourth pipe P4, a fifth pipe P5, the sixth pipe P6, a seventh pipe P7 and the eighth pipe P8 as refrigerant pipes. It should be noted that in the present embodiment, not electro-magnetic valves but electric valves (the first electric valve Ev1 and the second electric valve Ev2) are employed as switch valves in order to inhibit sound of the refrigerant passing through the interior of the first unit 71.

The first unit 71 is mainly divided into a first part R1 (corresponding to "first refrigerant pipe" described in claims), a second part R2 (corresponding to "second refrigerant pipe" described in claims) and a third part R3 (corresponding to "third refrigerant pipe" described in claims). The first unit 71 is constructed by connecting the first part R11, the second part R2 and the third part R3 through a connecting portion J1.

(3-1-4) First Part R1

The first part R1 is connected at one end to the suction gas communicating pipe 12 through the second header 56, and is also connected at the other end to the second part R2 and the third part R3 through the connecting portion J1. Specifically, the first part R1 is a part including the first electric valve Ev1, the fifth pipe P5 and the sixth pipe P6. It should be noted that from another perspective of view, the first part R1 can be regarded as a single refrigerant pipe connected to the suction gas communicating pipe 12 (i.e., the first part R1 corresponds to "first refrigerant pipe" described in claims).

The first electric valve Ev1 is an electric valve that its opening degree is adjustable, for instance, and is configured to switch the flow of the refrigerant by allowing or blocking passage of the refrigerant in accordance with its opening degree. As shown in FIG. 14 (a drive part of the first electric valve Ev1 is not shown in FIG. 14), the first electric valve Ev1 is made in an approximately columnar shape, and is disposed in a posture that its lengthwise direction is oriented in the up-and-down direction (vertical direction). The first electric valve Ev1 is connected at one end to the fifth pipe P5, and is also connected at the other end to the sixth pipe P6. It should be noted that in a plan view, the first electric valve Ev1 is located on a straight line on which a bottom part B1 (to be described) of the fourth pipe P4 and the fifth pipe P5 extend (see FIG. 7, etc.).

The fifth pipe P5 is connected at one end to the connecting portion J1, and is also connected at the other end to the first electric valve Ev1. More specifically, the fifth pipe P5 forwardly (horizontally) extends from the one end (its connecting-part to the connecting portion J1) and is connected at the other end to the first electric valve Ev1 (see FIGS. 13 and 14).

The sixth pipe P6 is connected at one end to the second header 56, and is also connected at the other end to the first electric valve Ev1. More specifically, the sixth pipe P6 gently extends upward from the one end (i.e., its connecting-part to the second header 56), then curves and extends downward, further curves and extends forward (horizontally), yet further curves and extends upward (vertically), and is connected at the other end to the first electric valve Ev1 (see FIGS. 6, 10, 13 and 14). The sixth pipe P6 thus upwardly extends partially from its connecting-part to the second header 56 in order to form a trap for inhibiting the refrigerant existing in the second header 56 and the refrigerator oil compatibly mixed with the refrigerant from flowing into the sixth pipe P6 in a situation such as deactivation of the air conditioning system 100. It should be noted that the sixth pipe P6 is connected approximately perpendicularly to the second header 56.

(3-1-2) Second Part R2

The second part R2 is connected at one end to the high-low pressure gas communicating pipe 13 through the first header 55, and is also connected at the other end to the first part R1 and the third part R3 through the connecting portion J1. Specifically, the second part R2 is a part including the second electric valve Ev2, the seventh pipe P7 and the eighth pipe P8. It should be noted that from another perspective of view, the second part R2 can be regarded as a single refrigerant pipe connected to the high-low pressure gas communicating pipe 13 (i.e., the second part R2 corresponds to "second refrigerant pipe" described in claims).

The second electric valve Ev2 is, for instance, an electric valve that its opening degree is adjustable. Specifically, the second electric valve Ev2 is formed a minute channel rp in its interior, and enables the refrigerant to flow through the minute channel rp even when its opening degree is set to be the minimum degree (lowest degree). Thus, the second electric valve Ev2 is configured not to be completely closed even when its opening degree is minimized. As shown in FIG. 14 (a drive part of the second electric valve Ev2 is not shown in FIG. 14), the second electric valve Ev2 is made in an approximately columnar shape, and is disposed in a posture that its lengthwise direction is oriented in the up-and-down direction (vertical direction). The second electric valve Ev2 is connected at one end to the seventh pipe P7, and is also connected at the other end to the eighth pipe P8. It should be noted that as shown in FIG. 10 and the like, the second electric valve Ev2 is disposed rearward of the first electric valve Ev1. Also, the second electric valve Ev2 is disposed above (in a higher position than) the first electric valve Ev1. It should be noted that the second electric valve Ev2 will be explained in detail in "(6) Detailed Explanation of Second Electric Valve Ev2" to be described.

The seventh pipe P7 is connected at one end to the connecting portion J1, and is also connected at the other end to the second electric valve Ev2. More specifically, the seventh pipe P7 upwardly (vertically) extends from the one end (i.e., its connecting-part to the connecting portion J1) and is connected at the other end to the second electric valve Ev2 (see FIGS. 13 and 14).

The eighth pipe P8 is connected at one end to the second electric valve Ev2, and is also connected at the other end to the first header 55. More specifically, the eighth pipe P8 extends rearward (horizontally) from the one end (i.e., its connecting-part to the second electric valve Ev2) and is connected at the other end approximately perpendicularly to the first header 55 (see FIGS. 13 and 14).

(3-1-3) Third Part R3

The third part R3 is connected at one end to its relevant gas pipe GP, and is also connected at the other end to the first part R1 and the second part R2 through the connecting portion J1. Specifically, the third part R3 is a part including the first filter F11, the third pipe P3, the fourth pipe P4 and the connecting portion J1. It should be noted that from another perspective of view, the third part R3 can be regarded as a single refrigerant pipe connected to its relevant gas pipe GP (i.e., the third part R3 corresponds to "third refrigerant pipe" described in claims).

The first filter F11 is for removing foreign objects contained in the refrigerant passing therethrough. As shown in FIG. 14, the first filter F11 is made in an approximately columnar shape, and is disposed in a posture that its lengthwise direction is oriented in the back-and-forth direction (horizontal direction). The first filter F11 is connected at one end to the third pipe P3, and is also connected at the other end to the fourth pipe P4.

The third pipe P3 is connected at one end to its relevant gas pipe (GP, and is also connected at the other end to the first filter F11. It should be noted that the one end of the third pipe P3 is exposed to the outside from the back side of the casing 131 (see FIG. 6, FIG. 10, etc.).

The fourth pipe P4 is connected at one end to the first filter F11, and is also connected at the other end to the connecting portion J1. More specifically, the fourth pipe P4 extends from the one end (its connecting-part to the first filter F11) to the front side in an obliquely downwardly tilting posture, then horizontally (forwardly) extends, and is connected at the other end to the connecting portion J1 (see FIG. 10, etc).

The connecting portion J1 is a pipe coupler for refrigerant pipes configured and arranged to have an inverted T shape. The connecting portion J1 is designed to enable three pipes to be connected thereto through openings bored upward, forward and backward. The connecting portion J11 is connected to the other end of the fourth pipe P4 by flare fittings, brazing or the like. The third part R3 is connected to the fifth pipe P5 of the first part R1 and the seventh pipe P7 of the second part R2 through the connecting portion J1

(3-2) Second Unit 72

Figure 15:
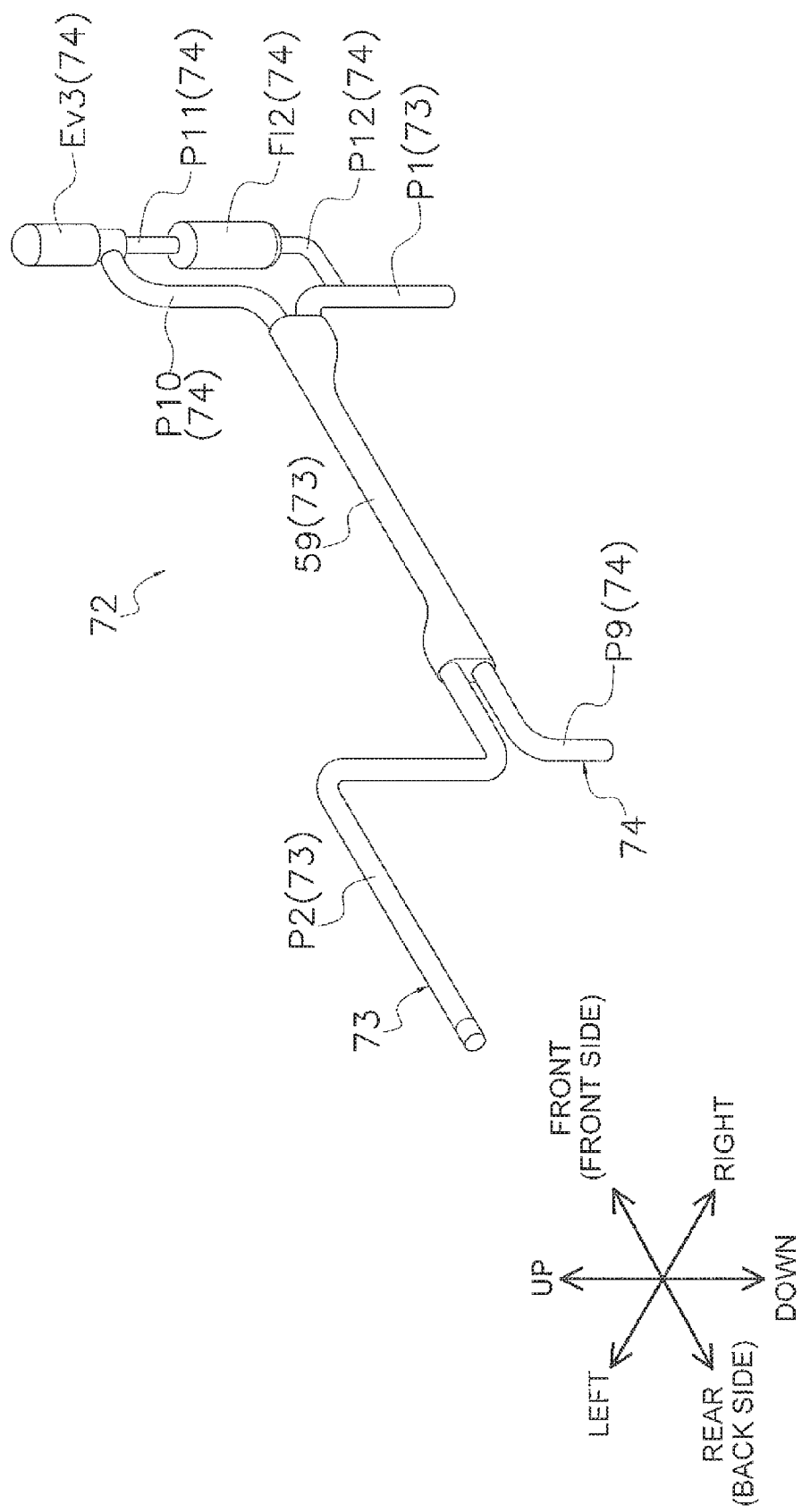
FIG. 15 is a perspective view of a second unit.

FIG. 15 is a perspective view of the second unit 72. The second unit 72 is mainly divided into the liquid communicating unit 73 (corresponding to "fourth refrigerant pipe" described in claims) and the bypass unit 74.

(3-2-1) Liquid Communicating Unit 73

The liquid communicating unit 73 is a unit for composing the liquid refrigerant circuit RC4 within each BS unit 70.

The liquid communicating unit 73 is connected at one end to the liquid communicating pipe 11 through the third header 57, and is also connected at the other end to its relevant liquid pipe LP. In other words, the liquid communicating unit 73 is a refrigerant pipe unit that mainly causes liquid refrigerant to flow between the liquid communicating pipe 11 and its relevant liquid pipe LP. From another perspective of view, the liquid communicating unit 73 can be regarded as a singe refrigerant pipe connected at one end to the liquid communicating pipe 11 and is connected at the other end to its relevant liquid pipe LP (i.e., the liquid communicating unit 73 corresponds to "fourth refrigerant pipe" described in claims).

The liquid communicating unit 73 mainly includes a supercooling heat exchange portion 59 and the first pipe P1 and the second pipe P2 as refrigerant pipes.

(3-2-1-1) Supercooling Heat Exchange Portion 59

The supercooling heat exchange portion 59 is, for instance, a heat exchanger of a two-nested-pipe type. The supercooling heat exchange portion 59 is made in an approximately tubular shape, and is formed a first channel 591 and a second channel 592 in the interior thereof. More specifically, the supercooling heat exchange portion 59 has a structure that enables heat exchange between the refrigerant flowing through the first channel 591 and the refrigerant flowing through the second channel 592. The first channel 591 is connected at one end to the first pipe P1, and is also connected at the other end to the second pipe P2. The second channel 592 is connected at one end to the ninth pipe P9, and is also connected at the other end to a tenth pipe P10.

The supercooling heat exchange portion 59 is disposed in a posture that it extends along the back-and-forth direction (horizontal direction). It should be noted that in the BS unit assembly 60, each supercooling heat exchange portion 59 extends in approximately parallel to each third pipe P3, each fourth pipe P4 and the like.

(3-2-1-2) Refrigerant Pipes within Liquid Communicating Unit 73

The first pipe P1 is connected at one end to the third header 57, and is also connected at the other end to the first channel 591 of the supercooling heat exchange portion 59. Specifically, the first pipe P1 upwardly (vertically) extends from the one end (i.e., its connecting-part to the third header 57) and is connected at the other end to the supercooling heat exchange portion 59 (see FIGS. 13 and 15). It should be noted that the first pipe P1 is connected approximately perpendicularly to the third header 57.

The second pipe P2 is connected at one end to the first channel 591 of the supercooling heat exchange portion 59, and is also connected at the other end to its relevant liquid pipe LP.

Specifically, the second pipe P2 extends rearward (horizontally) from the one end (i.e., its connecting-part to the supercooling heat exchange portion 59), then curves and extends upward (vertically), and further curves and extends rearward (horizontally) (see FIGS. 13 and 15). It should be noted that the other end of the second pipe P2 is exposed to the outside from the back side of the casing 131 (see FIG. 6, FIG. 10, etc.).

(3-2-2) Bypass Unit 74

The bypass unit 74 is a unit for bypassing the refrigerant from the fourth header 58 to the liquid communicating unit 73. Specifically, the bypass unit 74 is connected at one end to the fourth header 58, and is also connected at the other end to the first pipe P1 of the liquid communicating unit 73. The bypass unit 74 bypasses the gas refrigerant, which has passed through the sixth pipe P6 of the first unit 71 and has then flown into the fourth header 58 through the second header 56, to the first pipe P1 of the liquid communicating unit 73.

The bypass unit 74 mainly includes the third electric valve Ev3, a second filter F12, and ninth, tenth, eleventh and twelfth pipes P9, P10, P11 and P12 as refrigerant pipes.

(3-2-2-1) Third Electric Valve Ev3

The third electric valve Ev3 is an electric valve that its opening degree is adjustable, for instance, and is configured to switch the flow of the refrigerant by allowing or blocking passage of the refrigerant in accordance with its opening degree. As shown in FIG. 15 (a drive part of the third electric valve Ev3 is not shown in FIG. 15), the third electric valve Ev3 is made in an approximately columnar shape, and is disposed in a posture that its lengthwise direction is oriented in the up-and-down direction (vertical direction). Specifically, the third electric valve Ev3 is connected at one end to the tenth pipe P10, and is also connected at the other end to the eleventh pipe P11.

(3-2-2-2) Second Filter F12

The second filter F12 is for removing foreign objects contained in the refrigerant passing therethrough. As shown in FIG. 15, the second filter F12 is made in an approximately columnar shape, and is disposed in a posture that its lengthwise direction is oriented in the up-and-down direction (vertical direction). Specifically, the second filter F12 is connected at one end to the eleventh pipe P11, and is also connected at the other end to the twelfth pipe P12.

(3-2-2-3) Refrigerant Pipes within Bypass Unit 74

The ninth pipe P9 is connected at one end to the fourth header 58, and is also connected at the other end to the second channel 592 of the supercooling heat exchange portion 59. Specifically, the ninth pipe P9 upwardly (vertically) extends from the one end (i.e., its connecting-part to the fourth header 58), curves and extends forward (horizontally), and is connected to the supercooling heat exchange portion 59 (see FIGS. 13 and 15). It should be noted that the ninth pipe P9 is connected approximately perpendicularly to the fourth header 58.

The tenth pipe P10 is connected at one end to the second channel 592 of the supercooling heat exchange portion 59, and is also connected at the other end to the third electric valve Ev3. Specifically, the tenth pipe P10 upwardly (vertically) extends from the one end (i.e., its connecting-part to the supercooling heat exchange portion 59), and is connected at the other end to the third electric valve Ev3 (see FIGS. 13 and 15).

The eleventh pipe P11 is connected at one end to the third electric valve Ev3, and is also connected at the other end to the second filter F12. Specifically, the eleventh pipe P11 downwardly (vertically) extends from its part connected to the third electric valve Ev3, and is connected at the other end to the second filter F12 (see FIGS. 13 and 15).

The twelfth pipe P12 is connected at one end to the second filter 1F2, and is also connected at the other end to the first pipe P1. Specifically, the twelfth pipe P12 downwardly (vertically) extends from the one end (i.e., its connecting-part to the second filter F12), curves and extends rearward (horizontally), and is connected at the other end to the first pipe P1 (see FIGS. 13 and 15).

(4) Refrigerant Flow During Operation of Air Conditioning System 100

Refrigerant flow during operation of the air conditioning system 100 will be hereinafter explained for various conditions in which the indoor units 120a and 120b are assumed to be under operation.

It should be noted that in the following explanation, the other indoor units 120 (120c to 120p) are assumed to be under deactivation to make explanation simple. Due to this, the indoor expansion valves 51 in the indoor units 120 except for the indoor units 120a and 120b are assumed to be fully closed, and the first electric valves v1 and the third electric valves Ev3 in the BS units 70 except for the BS units 70a and 70b (i.e., BS units 70c to 70p) are assumed to be fully closed. Additionally, the second electric valves Ev2 in the BS units 70c to 70p are assumed to be opened at the minimum opening degree.

(4-1) Condition that Both Indoor Units 120a and 120b Perform Cooling Operation Under this condition, in each of the BS units 70a and 70b, the first electric valve Ev1 is configured to be fully opened and the second electric valve Ev2 is configured to be opened at the minimum opening degree. Additionally, the indoor expansion valve 51 in each of the indoor units 120a and 120b is configured to be opened at an appropriate opening degree, and the first outdoor expansion valve 34 and the second outdoor expansion valve 35 are configured to be fully opened.

When the compressor 25 is driven under the aforementioned condition, the high-pressure gas refrigerant produced by compression of the compressor 25, flows into the outdoor heat exchanger 30 through the discharge pipe 252, the first channel switch valve 26, the third channel switch valve 28 and the like, and condenses therein. The refrigerant, which has condensed in the outdoor heat exchanger 30, passes through the liquid-side stop valve 23 and the like, and flows into the liquid communicating pipe 11. The refrigerant, which has flown into the liquid communicating pipe 11, reaches the third header 57 of the intermediate unit 130 in due course, and flows into the first pipe P1 of the BS unit 70a or 70b (the second unit 72a or 72b).

The refrigerant, which has flown into the first pipe P1, flows through the second pipe P2, the relevant liquid pipe LP and the like, reaches the indoor unit 120a or 120b, flows into the indoor expansion valve 51, and is decompressed therein. The decompressed refrigerant flows into each indoor heat exchanger 52 and evaporates therein. The evaporated refrigerant flows into the third pipe P3 of the BS unit 70a or 70b (the first unit 71a or 71b) through the gas pipe GP.

The refrigerant, which has flown into the third pipe P3, flows through the fourth pipe P4, the fifth pipe P5, the sixth pipe P6 and the like, and reaches the second header 56. The refrigerant, which has reached the second header 56, flows into the outdoor unit 110 through the suction gas communicating pipe 12 and is sucked into the compressor 25.

It should be noted that when the indoor unit 120a or 120b is deactivated due to a thermo-off function or the like, the refrigerant existing in the second part R2 (the eighth pipe P8 and the seventh pipe P7) is bypassed to the first part R1 (the fifth pipe P5 and the like) through the minute channel rp of the second electric valve Ev2 and the like.

(4-2) Condition that Both Indoor Units 120a and 120b Perform Heating Operation Under this condition, in each of the BS units 70a and 70b, the first electric valve Ev1 is configured to be fully closed, whereas the second electric valve Ev2 is configured to be fully opened. Additionally, the indoor expansion valve 51 in each of the indoor units 120a and 120b is configured to be fully opened, and each of the first outdoor expansion valve 34 and the second outdoor expansion valve 35 is configured to be opened at an appropriate opening degree.

When the compressor 25 is driven under the aforementioned condition, the high-pressure gas refrigerant produced by compression of the compressor 25, flows into the high-low pressure gas communicating pipe 13 through the discharge pipe 252, the second channel switch valve 27 and the like. The refrigerant, which has flown into the high-low pressure gas communicating pipe 13, reaches the first header 55 of the intermediate unit 130 in due course. The refrigerant, which has reached the first header 55, flows into the eighth pipe P8 of the BS unit 70a or 70b (the first unit 71a or 71b) and then flows into the gas pipe GP through the seventh pipe P7, the fourth pipe P4, the third pipe P3 and the like.

The refrigerant, which has flown into the gas pipe GP, reaches the indoor unit 120a or 120b, flows into each indoor heat exchanger 52, and condenses therein. The condensed refrigerant flows into the second pipe P2 of the BS unit 70a or 70b (the second unit 72a or 72b) through the liquid pipe LP.

The refrigerant, which has flown into the second pipe P2, reaches the third header 57 through the first pipe P1 and the like. The refrigerant, which has reached the third header 57, flows into the outdoor unit 110 through the liquid communicating pipe 11.

The refrigerant, which has flown into the outdoor unit 110, is decompressed in the first outdoor expansion valve 34 or the second outdoor expansion valve 35. The decompressed refrigerant flows into the outdoor heat exchanger 30 and evaporates therein while passing through the outdoor heat exchanger 30. The evaporated refrigerant is sucked into the compressor 25 through the first channel switch valve 26 or the third channel switch valve 28 and the like.

(4-3) Condition that One Indoor Unit 120a/120b Performs Cooling Operation Whereas Other Indoor Unit 120b/120a Performs Heating Operation Under this condition, in one of the BS units 70a and 70b (hereinafter referred to as "one BS unit 70") associated with one of the indoor units 120 performing a cooling operation (hereinafter referred to as "one indoor unit 120"), the first electric valve Ev1 is configured to be fully opened, the second electric valve Ev2 is configured to be opened at the minimum opening degree, and the third electric valve Ev3 is configured to be opened at an appropriate opening degree. Additionally, in one indoor unit 120, the indoor expansion valve 51 is configured to be opened at an appropriate opening degree. In comparison with this, the other of the BS units 70a and 70b (hereinafter referred to as "the other BS unit 70") associated with the other of the indoor units 120 performing a heating operation (hereinafter referred to as "the other indoor unit 120"), the first electric valve Ev1 is configured to be fully closed and the second electric valve Ev2 is configured to be fully opened. Additionally, in the other indoor unit 120, the indoor expansion valve 51 is configured to be fully opened. Moreover, each of the first outdoor expansion valve 34 and the second outdoor expansion valve 35 is configured to be opened at an appropriate opening degree.

When the compressor 25 is driven under the aforementioned condition, the high-pressure gas refrigerant produced by compression of the compressor 25, flows into the high-low pressure gas communicating pipe 13 through the discharge pipe 252, the second channel switch valve 27 and the like. The refrigerant, which has flown into the high-low pressure gas communicating pipe 13, reaches the first header 55 of the intermediate unit 130 in due course. The refrigerant, which has reached the first header 55, flows into the first unit 71 in the other BS unit 70, and flows into the gas pipe GP through the eighth pipe P8, the seventh pipe P7, the fourth pipe P4, the third pipe P3 and the like.

The refrigerant, which has flown into the relevant gas pipe GP, reaches the other indoor unit 120, flows into the indoor heat exchanger 52, and condenses therein. The condensed refrigerant flows into the second pipe P2 of the liquid communicating unit 73 in the other BS unit 70 through the liquid pipe LP. The refrigerant, which has flown into the second pipe P2, reaches the third header 57 through the first pipe P1 and the like.

The refrigerant, which has reached the third header 57, reaches the liquid communicating unit 73 in the one BS unit 70 and flows into the first pipe P1. The refrigerant, which has flown into the first pipe P1, passes through the first channel 591 of the supercooling heat exchange portion 59 and reaches the one indoor unit 120 through the second pipe P2 and the liquid pipe LP.

The refrigerant, which has reached the one indoor unit 120, flows into the indoor expansion valve 51 and is decompressed therein. The decompressed refrigerant flows into the indoor heat exchanger 52 and evaporates therein. The evaporated refrigerant reaches the first unit 71 of the one BS unit 70 through the gas pipe GP and flows into the third pipe P3. The refrigerant, which has flown into the third pipe P3, flows through the fourth pipe P4, the fifth pipe P5, the sixth pipe P6 and the like, and reaches the second header 56.

Part of the refrigerant having reached the second header 56 flows into the outdoor unit 110 through the suction gas communicating pipe 12 and is sucked into the compressor 25. On the other hand, the rest of the refrigerant having reached the second header 56 flows into the fourth header 58 through the pairs of the first connecting part 561 and the second connecting part 581. In other words, the pairs of the first connecting part 561 and the second connecting part 581 play a role of connecting pipes that connect the second header 56 and the fourth header 58 and feed the refrigerant within the second header 56 to the fourth header 58.

The refrigerant, which has flown into the fourth header 58, reaches the bypass unit 74 in the one BS unit 70 and flows into the ninth pipe P9. The refrigerant, which has flown into the ninth pipe P9, flows into the second channel 592 of the supercooling heat exchange portion 59. The refrigerant, which has flown into the second channel 592, exchanges heat with the refrigerant passing through the first channel 591 when passing through the second channel 592, whereby the refrigerant passing through the first channel 591 is cooled. Accordingly, the refrigerant flowing through the first channel 591 is in a supercooled state.

The refrigerant, which has passed through the second channel 592, flows through the tenth pipe P10, the eleventh pipe P11, the twelfth pipe P12 and the like, and joins the refrigerant flowing through the first pipe P1.

It should be noted that when the one indoor unit 120 is deactivated due to a thermo-off function or the like, the refrigerant, existing in the second part R2 (the eighth pipe P8 and the seventh pipe P7) of the one BS unit 70, is bypassed to the first part R1 (the fifth pipe P5 and the like) through the minute channel rp of the second electric valve Ev2 and the like.

(5) Method of Manufacturing Intermediate Unit 130

Figure 16:
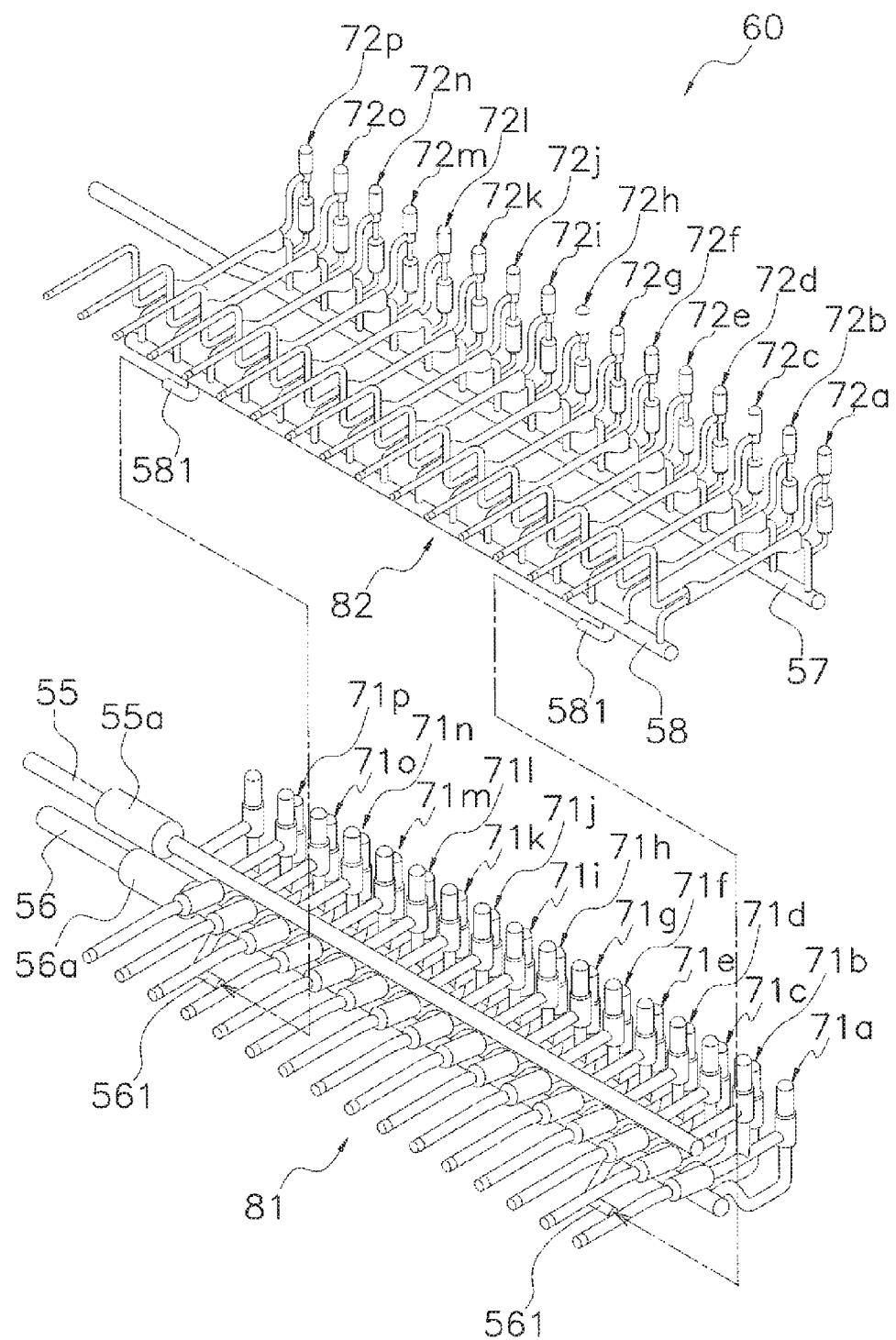
FIG. 16 is an exploded view of the BS unit assembly.

A method of manufacturing the intermediate unit 130 will be herein explained. FIG. 16 is an exploded view of the BS unit assembly 60.

The intermediate unit 130 is mainly manufactured by combining separately fabricated components such as the casing 131, the intermediate unit controller 132 and the BS unit assembly 60 including the plural BS units 70, in a production line.

Specifically, the BS unit assembly 60 is mounted onto the bottom side of the casing 131 manufactured by sheet metal working, and is suitably fixed thereto by screws and the like. Afterwards, the intermediate unit controller 132 is accommodated in the casing 131, and wiring connection between the intermediate unit controller 132 and the first, second and third electric valves Ev1, Ev2 and Ev3 and the like are performed. Finally, a drain pan and the like are mounted to the casing 131, and then, the top side and the front side part of the casing 131 are fixed by screws and the like.

It should be noted that as shown in FIG. 16, the BS unit assembly 60 is fabricated by combining a first assembly 81 and a second assembly 82 and then by fixing the combined first and second assemblies 81 and 82 with a fixing tool 601 (see FIGS. 6 and 12). The first assembly 81 is assembled by integrating the plural first units 71 (71a to 71p). The second assembly 82 is assembled by integrating the plural second units 72 (72a to 72p).

(6) Detailed Explanation of Second Electric Valve Ev2

Figure 17:
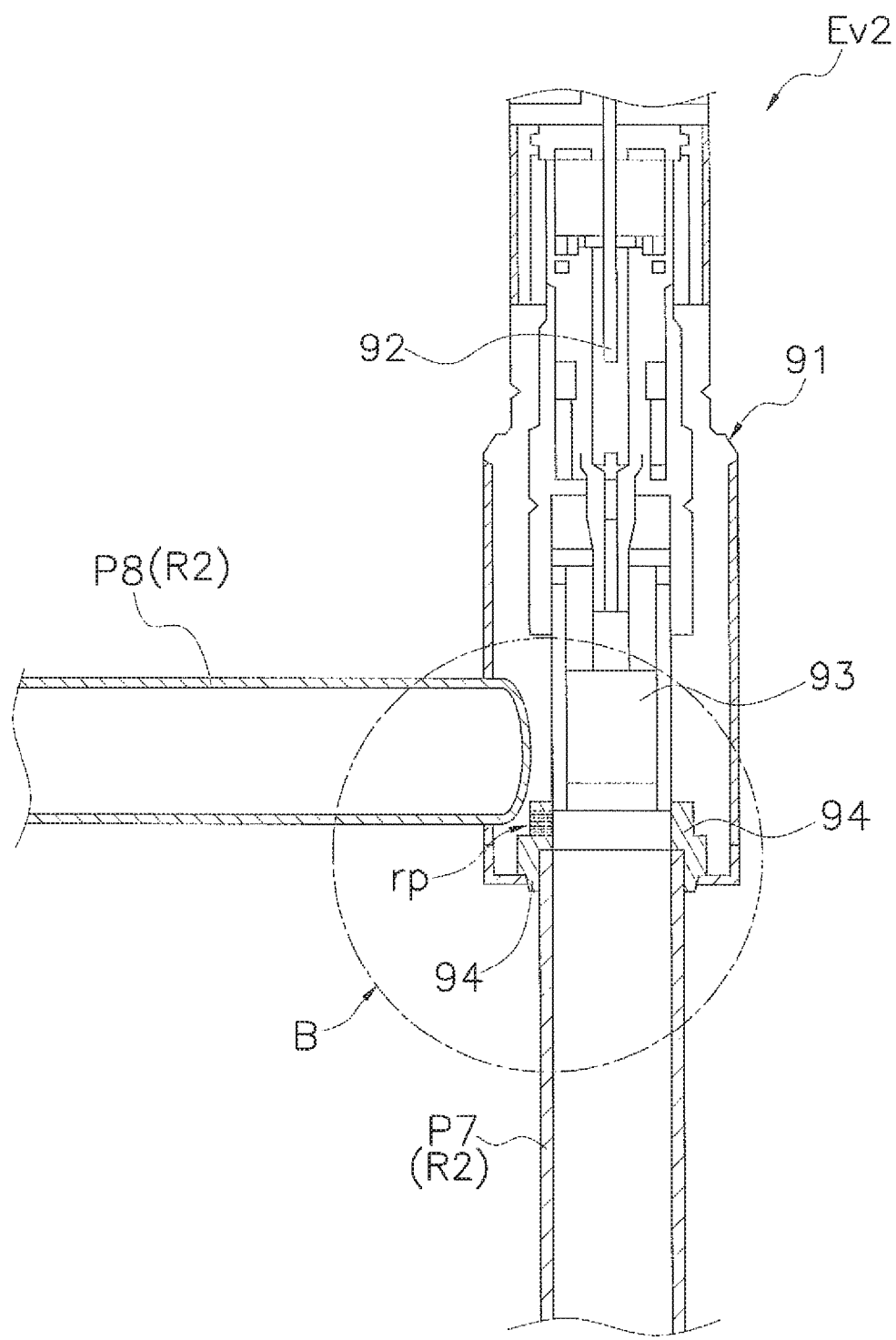
FIG. 17 is a cross-sectional view of a main part of a second electric valve.
Figure 18:
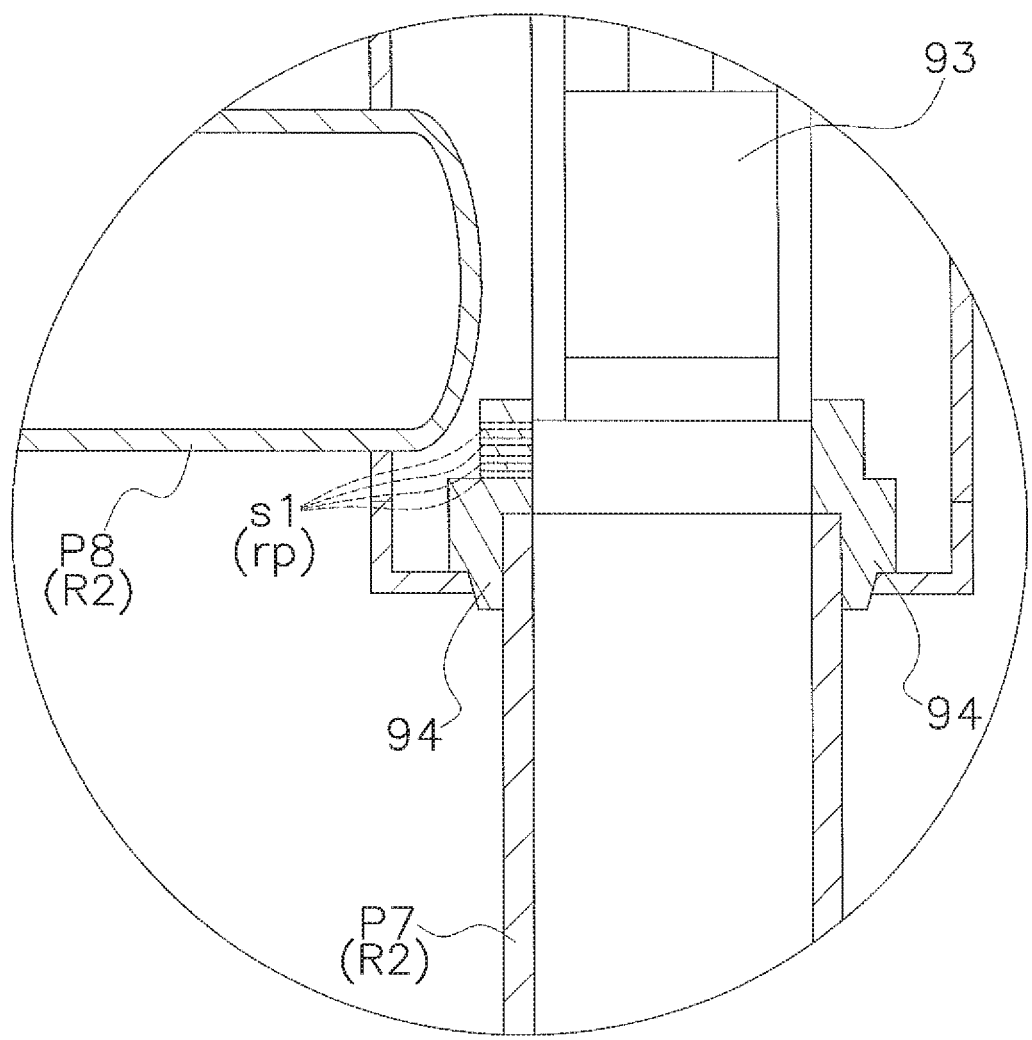
FIG. 18 is an enlarged view of a region B of FIG. 17.

The second electric valve Ev2 will be herein explained in detail. FIG. 17 is a cross-sectional view of a main part of the second electric valve Ev2 (without illustration of the drive part 90). FIG. 18 is an enlarged view of a region B of FIG. 17.

The second electric valve Ev2 is a so-called gear type electric valve, and is configured to transmit an output of a motor (not shown in the drawings) embedded in the drive part 90 to a valve element 93 through a pinion, a gear and the like so as to drive the valve element 93 up and down. The second electric valve Ev2 includes the drive part 90 (see FIGS. 6 and 10) and a valve body 91 to which the drive part 90 is fixed. The valve body 91 accommodates an output shaft 92, the valve element 93 and a valve seat 94 in its interior.

The output shaft 92 is integrally constructed with the gear (not shown in the drawings) engaged with the pinion fixed to a shaft of the motor. The output shaft 92 is configured to be, in conjunction with driving of the motor, rotated and be moved up and down. The valve element 93 is connected to the output shaft 92, and is configured to be elevated or lowered in conjunction with movement of the output shaft 92. It should be noted that when the valve element 93 is lowered most, the second electric valve Ev2 is configured to be opened at the minimum opening degree.

The valve seat 94 is shaped such that the valve element 93 is fitted thereto. As shown in FIG. 18, a plurality of slits (grooves) s1 is formed in the valve seat 94 whereby the minute channel rp is formed in the second electric valve Ev2. In other words, when the second electric valve Ev2 is opened at the minimum opening degree, the refrigerant existing within its relevant eighth pipe P8 flow into its relevant seventh pipe P7 through the slits s1.

Accordingly, when each second electric valve Ev2 is opened at the minimum opening degree, formation of a liquid seal circuit is inhibited in its relevant utilization-side refrigerant circuit RC2 and its relevant gas refrigerant circuit RC3. Additionally, when each second electric valve Ev2 is opened at the minimum opening degree, the refrigerant and the refrigeration lubricant, existing in the high-low pressure gas communicating pipe 13, its relevant eighth pipe P8 and the like, are also bypassed through the minute channel rp, and are thereby unlikely to be accumulated therein.

(7) Features (7-1)

In the aforementioned embodiment, the minute channel rp is formed in the second electric valve Ev2. The minute channel rp is configured and arranged to enable the refrigerant to flow through the minute channel rp even when the opening degree of the second electric valve Ev2 is set to be the lowest degree.

With the construction and configuration, formation of a liquid seal circuit is inhibited within the utilization-side refrigerant circuit RC2 and the gas refrigerant circuit RC3 without separately providing a constituent element (e.g., bypass pipe) for inhibiting liquid sealing. Therefore, refrigerant running sound is inhibited, safety is ensured, and compactness in size is enhanced. In other words, even when electric valves (the first and second electric valves Ev1 and Ev2) are used as switch valves, it is not required to separately provide a bypass circuit for inhibiting liquid sealing. Hence, each BS unit 70 and the intermediate unit 130 can be constructed in compact size.

Additionally, when the gas refrigerant at high pressure flows through the high-low pressure gas communicating pipe 13, the volume of the refrigerant existing within the high-low pressure gas communicating pipe 13 is larger than that of the refrigerant existing within the suction gas communicating pipe 12. Also, the refrigerant is likely to be accumulated in the high-low pressure gas communicating pipe 13. However, with the minute channel rp formed in the second electric valve Ev2, the refrigerant existing within the high-low pressure gas communicating pipe 13 and the refrigeration lubricant compatibly mixed with the refrigerant are led to the interior of each BS unit 70 through the minute channel rp, and are unlikely to be accumulated in the high-low pressure gas communicating pipe 13.

(7-2)

In the aforementioned embodiment, the slits s1 as the minute channel rp are formed in the valve seat 94 of the second electric valve Ev2 In other words, the minute channel rp of the second electric valve Ev2 corresponds to the slits s1 formed in the valve seat 94. Thus, the minute channel rp is formed with the simple construction. Consequently, increase in cost is inhibited.

(7-3)

In the aforementioned embodiment, the air conditioning system 100 includes the intermediate unit 130 and the BS units 70, each of which is not required to be provided with a constituent element (e.g., bypass pipe) for inhibiting liquid sealing and is thus compactly constructed by that much. Thus, the intermediate unit 130 and the BS units 70 are easily installed even in a small and narrow space. Consequently, easiness in installation of the air conditioning system 100 is enhanced.

(8) Modifications (8-1) Modification A

In the aforementioned embodiment, the air conditioning system 100 is designed to include a single set of the outdoor unit 110. However, the number of sets of the outdoor units 110 is not limited to the above, and may be plural. Additionally, the air conditioning system 100 is designed to include 16 sets of the indoor units 120. However, the number of sets of the indoor units 120 is not limited to the above, and may be any arbitrary number.

(8-2) Modification B

In the aforementioned embodiment, the intermediate unit 130 (the BS unit assembly 60) is designed to include 16 sets of the BS units 70. However, the number of sets of the BS units 70 is not limited to the above, and may be any arbitrary number. For example, the number of sets of the BS units 70 disposed in the intermediate unit 130 (the BS unit assembly 60) may be four, six or eight, and alternatively, may be twenty-four.

(8-3) Modification C

In the aforementioned embodiment, in the intermediate unit 130 (the BS unit assembly 60), the first units 71 and the second units 72 (the liquid communicating units 73) are alternately aligned in the horizontal direction. However, alignment of the first units 71 and the second units 72 is not limited to the above. For example, the first units 71 and the second units 72 (the liquid communicating units 73) may be alternately disposed in vertical alignment.

(8-4) Modification D

In the aforementioned embodiment, the BS units 70 are accommodated in the casing 131 in the state of being aggregated as the BS unit assembly 60. However, the construction to accommodate the BS units 70 in the casing 131 is not limited to the above. Each of the BS units 70 may be accommodated in a separate casing without being aggregated with the other BS units 70 as the BS unit assembly 60. In this case, the first header 55, the second header 56 or the third header 57 may not be provided, and the first part R1 (the sixth pipe P6), the second part R2 (the eighth pipe P8) or the liquid communicating unit 73 (the first pipe P1) may be designed to be directly connected to the high-low pressure gas communicating pipe 13, the suction gas communicating pipe 12 or the liquid communicating pipe 11.

(8-5) Modification E

In the aforementioned embodiment, the gear type electric valve has been used as each second electric valve Ev2. However, each second electric valve Ev2 is not limited to this, and may be of another type as long as a minute channel is formed therein. For example, a so-called direct acting electro-magnetic valve may be employed as each second electric valve Ev2.

(8-6) Modification F

In the aforementioned embodiment, the minute channel rp formed in the second electric valve Ev2 is made in the aspect shown in FIG. 18. However, the minute channel rp is not limited to this, and may be formed as a minute channel rp' shown in FIG. 19.

Figure 19:
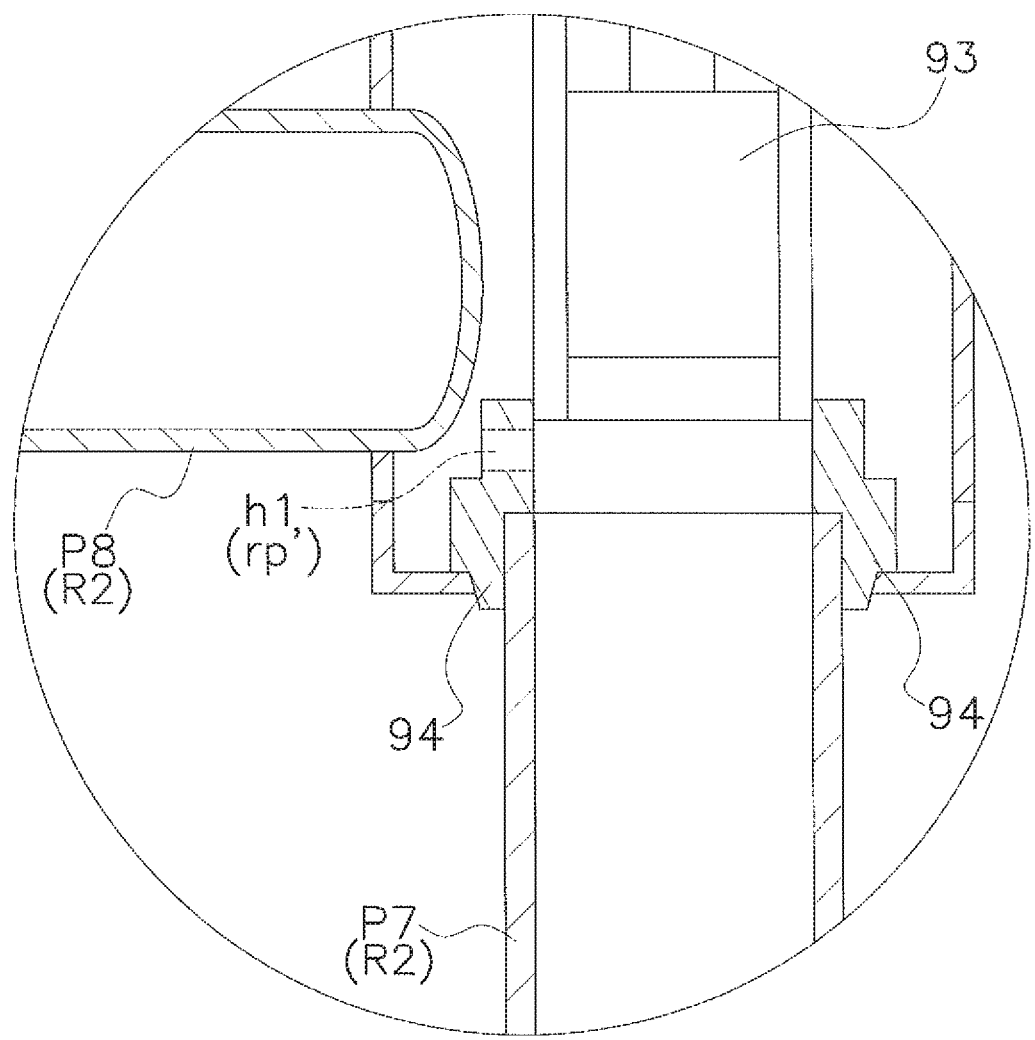
FIG. 19 is a schematic diagram showing a minute channel according to Modification F.

In FIG. 19, the minute channel rp' is formed by forming a communicating hole h1 in the valve seat 94 of each second electric valve Ev2 instead of forming the slits s1. In short, when each second electric valve Ev2, which is formed the communicating hole h1 as the minute channel rp', is opened at the minimum opening degree, the refrigerant existing within its relevant eighth pipe P8 flows into its relevant seventh pipe P7 through the communicating hole h1. In other words, the minute channel rp' is the communicating hole h1 formed in the valve seat 94. Accordingly, the minute channel can be formed with the simple construction.

(8-7) Modification G

In the aforementioned embodiment, the minute channel rp is formed in the second electric valve Ev2. However, the minute channel rp may be formed in not the second electric valve Ev2 but the first electric valve Ev1. Alternatively, the minute channel rp may be formed in both the second electric valve Ev2 and the first electric valve Ev1.

INDUSTRIAL APPLICABILITY

The present invention can be utilized for a refrigerant channel switching unit configured to switch flow of refrigerant and a refrigeration apparatus including the same.

What is claimed is:
1. A refrigerant channel switching unit adapted to be disposed between a heat source unit and a utilization unit, the refrigerant channel switching unit being configured and arranged to switch flow of refrigerant in a refrigerant circuit formed by the heat source unit and the utilization unit, the refrigerant channel switching unit comprising:
- a first refrigerant pipe configured and arranged to be connected to a suction gas communicating pipe extending from the heat source unit;
- a second refrigerant pipe configured and arranged to be connected to a high-low pressure gas communicating pipe extending from the heat source unit;
- a third refrigerant pipe connected to the first refrigerant pipe and the second refrigerant pipe and being configured and arranged to be connected to a gas pipe extending to the utilization unit;
- a fourth refrigerant pipe configured and arranged to be connected at one end to a liquid communicating pipe extending from the heat source unit, the fourth refrigerant pipe being configured and arranged to be connected at the other end to a liquid pipe extending to the utilization unit;
- a first electric valve mounted to the first refrigerant pipe; and
- a second electric valve mounted to the second refrigerant pipe,
- a minute channel being formed in the first electric valve or the second electric valve, the minute channel being configured and arranged to enable the refrigerant to flow through the minute channel even when an opening degree of the first electric valve or the second electric valve is set to be the lowest degree.

2. The refrigerant channel switching unit according to claim 1, wherein
the minute channel is formed in the second electric valve.

3. The refrigerant channel switching unit according to claim 1, wherein
the minute channel is a groove formed in a valve seat.

4. The refrigerant channel switching unit according to claim 1, wherein
the minute channel is a hole formed in a valve seat.

5. The refrigerant channel switching unit according to claim 2, wherein
the minute channel is a groove formed in a valve seat.

6. The refrigerant channel switching unit according to claim 2, wherein
the minute channel is a hole formed in a valve seat.

7. A refrigeration apparatus, comprising:
- a heat source unit and a utilization unit arranged to form a refrigerant circuit;
- a suction gas communicating pipe connected to the heat source unit;
- a high-low pressure gas communicating pipe connected to the heat source unit;
- a liquid communicating pipe connected to the heat source unit;
- a gas pipe connected to the utilization unit;
- a liquid pipe connected to the utilization unit; and
- a refrigerant channel switching unit disposed between a heat source unit and a utilization unit, the refrigerant channel switching unit being configured and arranged to switch flow of refrigerant in the refrigerant circuit, the refrigerant channel switching unit including
  - a first refrigerant pipe connected to the suction gas communicating pipe,
  - a second refrigerant pipe connected to the high-low pressure gas communicating pipe
  - a third refrigerant pipe connected to the first refrigerant pipe, the second refrigerant pipe and the gas pipe,
  - a fourth refrigerant pipe connected at one end to the liquid communicating pipe and at the other end to the liquid pipe,
  - a first electric valve mounted to the first refrigerant pipe, and
  - a second electric valve mounted to the second refrigerant pipe,
  - a minute channel being formed in the first electric valve or the second electric valve, the minute channel being configured and arranged to enable the refrigerant to flow through the minute channel even when an opening degree of the first electric valve or the second electric valve is set to be the lowest degree.

8. The refrigeration apparatus according to claim 7, wherein the minute channel is formed in the second electric valve.

9. The refrigeration apparatus according to claim 8, wherein the minute channel is a groove formed in a valve seat.

10. The refrigeration apparatus according to claim 8, wherein the minute channel is a hole formed in a valve seat.

11. The refrigeration apparatus according to claim 7, wherein the minute channel is a groove formed in a valve seat.

12. The refrigeration apparatus according to claim 7, wherein the minute channel is a hole formed in a valve seat.

* * * * *